(12) United States Patent
Sun et al.

(10) Patent No.: US 12,072,021 B2
(45) Date of Patent: Aug. 27, 2024

(54) VEHICLE GEAR CONTROL METHOD AND APPARATUS, COMPUTER DEVICE, AND STORAGE MEDIUM

(71) Applicant: Tencent Technology (Shenzhen) Company Limited, Guangdong (CN)

(72) Inventors: Zhongyang Sun, Shenzhen (CN); Hao An, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 24 days.

(21) Appl. No.: 17/992,513

(22) Filed: Nov. 22, 2022

(65) Prior Publication Data

US 2023/0089742 A1 Mar. 23, 2023

Related U.S. Application Data

(63) Continuation of application No. PCT/CN2022/075722, filed on Feb. 9, 2022.

(30) Foreign Application Priority Data

Feb. 23, 2021 (CN) .......................... 202110200539.1

(51) Int. Cl.
*F16H 61/02* (2006.01)
*F16H 59/18* (2006.01)
(Continued)

(52) U.S. Cl.
CPC ......... *F16H 61/0213* (2013.01); *F16H 59/18* (2013.01); *F16H 59/24* (2013.01);
(Continued)

(58) Field of Classification Search
CPC ...... F16H 61/0213; F16H 59/18; F16H 59/24; F16H 59/44; F16H 59/48; F16H 59/66;
(Continued)

(56) References Cited

U.S. PATENT DOCUMENTS 11,655,893 B1\* 5/2023 Pertsel .................. G06V 10/95
701/59
11,763,410 B1\* 9/2023 Roy ....................... G06Q 40/02
701/117
(Continued)

FOREIGN PATENT DOCUMENTS

CN 107850208 A 3/2018
CN 108510771 A 9/2018
(Continued)

OTHER PUBLICATIONS

International Search Report and Written Opinion in PCT/CN2022/075722, mailed Apr. 27, 2022, 12 pages.
(Continued)

*Primary Examiner* — Colby M Hansen
(74) *Attorney, Agent, or Firm* — ARENTFOX SCHIFF LLP

(57) ABSTRACT

A vehicle gear control method includes acquiring a driving scene image while a vehicle is driving, and performing image recognition on the acquired driving scene image to obtain a driving scene label including at least one of a road attribute label, a traffic attribute label, or an environment attribute label. The method further includes acquiring driving status data and driving behavior data corresponding to the vehicle. The driving status data indicates at least one of vehicle speed and vehicle acceleration and the driving behavior data indicates at least one of a brake control input, an accelerator control input, or a throttle opening degree. The method further includes determining a gear shifting mode based on the driving status data, the driving behavior data, and the driving scene label. The gear shifting mode controls the vehicle to drive according to a corresponding gear at a corresponding gear shifting time.

20 Claims, 7 Drawing Sheets

(51) Int. Cl.
  *F16H 59/24* (2006.01)
  *F16H 59/44* (2006.01)
  *F16H 59/48* (2006.01)
  *F16H 59/66* (2006.01)
  *F16H 59/68* (2006.01)
  *G06V 10/40* (2022.01)
  *G06V 10/764* (2022.01)
  *G06V 20/56* (2022.01)
  *G06V 20/58* (2022.01)
  *G06V 20/70* (2022.01)
  *F16H 61/00* (2006.01)

(52) U.S. Cl.
  CPC ............ *F16H 59/44* (2013.01); *F16H 59/48* (2013.01); *F16H 59/66* (2013.01); *F16H 59/68* (2013.01); *G06V 10/40* (2022.01); *G06V 10/764* (2022.01); *G06V 20/582* (2022.01); *G06V 20/584* (2022.01); *G06V 20/588* (2022.01); *G06V 20/70* (2022.01); *F16H 2061/0087* (2013.01); *F16H 2061/0218* (2013.01); *F16H 2061/022* (2013.01); *F16H 2061/0234* (2013.01)

(58) Field of Classification Search
  CPC ...... F16H 59/68; G06V 20/70; G06V 20/584; G06V 20/582; G06V 20/588; G06V 10/764; G06V 10/40
  USPC .......................................................... 701/55
  See application file for complete search history.

(56) References Cited

U.S. PATENT DOCUMENTS

| | | |
|---|---|---|
| 2010/0030437 A1 | 2/2010 | Kim et al. |
| 2016/0084374 A1 | 3/2016 | Kim |
| 2017/0277194 A1 | 9/2017 | Frazzoli et al. |

FOREIGN PATENT DOCUMENTS

| | | |
|---|---|---|
| CN | 108644374 A | 10/2018 |
| CN | 108995655 A | 12/2018 |
| CN | 109237011 A | 1/2019 |
| CN | 109829395 A | 5/2019 |
| CN | 109857002 A | 6/2019 |
| CN | 109866765 A | 6/2019 |
| CN | 109910892 A | 6/2019 |
| CN | 110206878 A | 9/2019 |
| CN | 110725944 A | 1/2020 |
| CN | 111457083 A | 7/2020 |
| CN | 111666921 A | 9/2020 |
| CN | 112092797 A | 12/2020 |
| CN | 112818910 A | 5/2021 |

OTHER PUBLICATIONS

Office Action in CN202110200539.1, mailed Sep. 17, 2021, 29 pages.

* cited by examiner

```
                                                                          S602
┌─────────────────────────────────────────────────────────────────────────────┐
│ During the driving of a vehicle, collect scene information around the vehicle in real time by an │
│    on-board camera deployed on the vehicle to obtain at least one driving scene image            │
└─────────────────────────────────────────────────────────────────────────────┘
                                        ▼                                 S604
┌─────────────────────────────────────────────────────────────────────────────┐
│ Based on road features which are extracted from the driving scene image, output at least one of a │
│ road slope label, a bend curvature label, a road surface adhesion label, a road surface evenness  │
│                 label, a traffic light label, and a traffic sign label by a second road model    │
└─────────────────────────────────────────────────────────────────────────────┘
                                        ▼                                 S606
┌─────────────────────────────────────────────────────────────────────────────┐
│ Based on traffic features which are extracted from the driving scene image, output at least one of │
│  a pedestrian danger level label, a pedestrian congestion condition label, a motor vehicle danger │
│  level label, a motor vehicle congestion condition label, a non-motor vehicle danger level label  │
│                  and a non-motor vehicle congestion condition label by a second traffic model     │
└─────────────────────────────────────────────────────────────────────────────┘
                                        ▼                                 S608
┌─────────────────────────────────────────────────────────────────────────────┐
│  Based on environment features which are extracted from the driving scene image, output at least  │
│    one of a road visibility label, a weather condition label, and a light intensity label by a second │
│                                     environment model                                            │
└─────────────────────────────────────────────────────────────────────────────┘
                                        ▼                                 S610
┌─────────────────────────────────────────────────────────────────────────────┐
│           Acquire driving status data and driving behavior data corresponding to the vehicle     │
└─────────────────────────────────────────────────────────────────────────────┘
                                        ▼                                 S612
┌─────────────────────────────────────────────────────────────────────────────┐
│  Determine a target driving mode; acquire a target gear shifting schedule table corresponding to  │
│ the target driving mode; and look up a corresponding candidate gear shifting mode from the gear   │
│       shifting schedule table according to the driving status data and the driving behavior data  │
└─────────────────────────────────────────────────────────────────────────────┘
                                        ▼                                 S614
┌─────────────────────────────────────────────────────────────────────────────┐
│ Determine a label priority of each driving scene label corresponding to the driving scene image;  │
│    and determine a label confidence of each driving scene label corresponding to the driving scene│
│                                            image                                                 │
└─────────────────────────────────────────────────────────────────────────────┘
                                        ▼                                 S616
┌─────────────────────────────────────────────────────────────────────────────┐
│  Based on the label priority and the label confidence, screen a target driving scene label from the │
│      driving scene labels corresponding to the driving scene images, and determine a target gear  │
│     shifting mode matched with the vehicle according to the target driving scene label, the driving│
│                              status data, and the driving behavior data                          │
└─────────────────────────────────────────────────────────────────────────────┘
                                        ▼                                 S618
┌─────────────────────────────────────────────────────────────────────────────┐
│    Determine a gear range and a gear shifting time range, which correspond to the driving scene  │
│                    label, the driving status data and the driving behavior data                  │
└─────────────────────────────────────────────────────────────────────────────┘
                                        ▼                                 S620
┌─────────────────────────────────────────────────────────────────────────────┐
│ In a case that a candidate gear in the candidate gear shifting mode exceeds the gear range, adjust │
│        the candidate gear according to the gear range to obtain a target gear matched with the vehicle │
└─────────────────────────────────────────────────────────────────────────────┘
                                        ▼                                 S622
┌─────────────────────────────────────────────────────────────────────────────┐
│  In a case that candidate gear shifting time in the candidate gear shifting mode exceeds the gear │
│      shifting time range, adjust the candidate gear shifting time according to the gear shifting time │
│                     range to obtain target gear shifting time matched with the vehicle           │
└─────────────────────────────────────────────────────────────────────────────┘
                                        ▼                                 S624
┌─────────────────────────────────────────────────────────────────────────────┐
│  In a case that there are a preset number of driving scene labels having a difference less than or │
│      equal to a preset difference threshold in driving scene labels corresponding to a plurality of │
│ driving scene images, control the vehicle during driving through the target gear shifting mode to │
│                      drive according to the target gear at the target gear shifting time          │
└─────────────────────────────────────────────────────────────────────────────┘
                                        ▼                                 S626
┌─────────────────────────────────────────────────────────────────────────────┐
│ Determine label confidences corresponding to the road attribute label, the traffic attribute label, │
│          and the environment attribute label, respectively; in a case that the label confidences  │
│ corresponding to the road attribute label, the traffic attribute label, and the environment attribute │
│ label, respectively are greater than or equal to a preset confidence threshold, control the vehicle │
│     during driving through the target gear shifting mode to drive according to the target gear at the │
│                                      target gear shifting time                                   │
└─────────────────────────────────────────────────────────────────────────────┘
```

FIG. 6

VEHICLE GEAR CONTROL METHOD AND APPARATUS, COMPUTER DEVICE, AND STORAGE MEDIUM

RELATED APPLICATIONS

This application is a continuation of International Application No. PCT/CN2022/075722, entitled "VEHICLE GEAR CONTROL METHOD AND APPARATUS, COMPUTER DEVICE, AND STORAGE MEDIUM," and filed on Feb. 9, 2022, which claims priority to Chinese Patent Application No. 202110200539.1, entitled "VEHICLE GEAR CONTROL METHOD AND APPARATUS, COMPUTER DEVICE, AND STORAGE MEDIUM" and filed on Feb. 23, 2021. The entire disclosures of the prior applications are hereby incorporated by reference.

FIELD OF THE TECHNOLOGY

This application relates to the technical field of vehicle control, including a vehicle gear control method and apparatus, a computer device, and a storage medium.

BACKGROUND OF THE DISCLOSURE

A transmission is one of core components of vehicles and can provide a necessary tractive force by shifting gears according to the driving requirements of the vehicles, to maintain normal driving of the vehicles. However, slow and delayed gear shifting will greatly affect the drivability and power performance of the vehicles. Therefore, in order to improve the drivability and power performance of the vehicles, an automatic transmission emerges. The automatic transmission can implement automatic gear shifting of the vehicles, so as to reduce the driving fatigue of drivers and improve driving safety.

In the related art, the automatic transmission can determine a corresponding gear shifting mode based on vehicle speeds and automatically shift gears according to the corresponding gear shifting mode. However, the influences on gear shifting, caused by driving environments during driving, are not taken into account in the related art, resulting in an inaccurate selection of gear shifting mode.

SUMMARY

In an embodiment, a vehicle gear control method includes acquiring a driving scene image while a vehicle is driving, and performing image recognition on the acquired driving scene image to obtain a driving scene label including at least one of a road attribute label, a traffic attribute label, or an environment attribute label. The method further includes acquiring driving status data and driving behavior data corresponding to the vehicle. The driving status data indicates at least one of vehicle speed and vehicle acceleration and the driving behavior data indicates at least one of a brake control input, an accelerator control input, or a throttle opening degree. The method further includes determining a gear shifting mode based on the driving status data, the driving behavior data, and the driving scene label. The gear shifting mode controlling the vehicle to drive according to a corresponding gear at a corresponding gear shifting time.

In an embodiment, a vehicle gear control apparatus includes processing circuitry configured to acquire a driving scene image while a vehicle is driving, and perform image recognition on the acquired driving scene image to obtain a driving scene label including at least one of a road attribute label, a traffic attribute label, or an environment attribute label. The processing circuitry is further configured to acquire driving status data and driving behavior data corresponding to the vehicle. The driving status data indicates at least one of vehicle speed and vehicle acceleration and the driving behavior data indicates at least one of a brake control input, an accelerator control input, or a throttle opening degree. The processing circuitry is further configured to determine a gear shifting mode based on the driving status data, the driving behavior data, and the driving scene label. The gear shifting mode controlling the vehicle to drive according to a corresponding gear at a corresponding gear shifting time.

In an embodiment, a non-transitory computer-readable storage medium stores computer-readable instructions which, when executed by a computer device, cause the computer device to perform a vehicle gear control method. The vehicle gear control method includes acquiring a driving scene image while a vehicle is driving, and performing image recognition on the acquired driving scene image to obtain a driving scene label including at least one of a road attribute label, a traffic attribute label, or an environment attribute label. The method further includes acquiring driving status data and driving behavior data corresponding to the vehicle. The driving status data indicates at least one of vehicle speed and vehicle acceleration and the driving behavior data indicates at least one of a brake control input, an accelerator control input, or a throttle opening degree. The method further includes determining a gear shifting mode based on the driving status data, the driving behavior data, and the driving scene label. The gear shifting mode controlling the vehicle to drive according to a corresponding gear at a corresponding gear shifting time.

BRIEF DESCRIPTION OF THE DRAWINGS

FIG. 6 is a schematic flowchart of a vehicle gear control method according to an embodiment.

DESCRIPTION OF EMBODIMENTS

Figure 1:
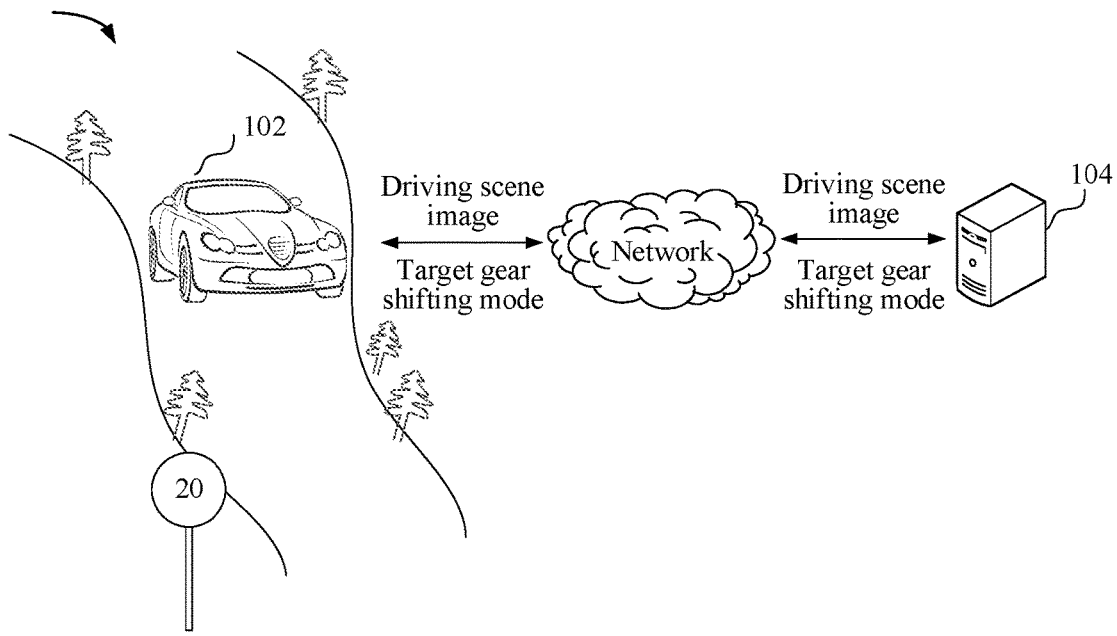
FIG. 1 is a diagram of an application environment of a vehicle gear control method according to an embodiment.

FIG. 1 is a diagram of an application environment of a vehicle gear control method according to an embodiment. Referring to FIG. 1, the vehicle gear control method is applied to a vehicle gear control system 100. The vehicle gear control system 100 includes a vehicle 102 and a server 104. The vehicle 102 is communicated with the server 104 through a network. It is to be noted that: a vehicle 102 side may be separately used for performing the vehicle gear control method provided by the embodiments of this disclosure. The vehicle 102 and the server 104 may be collaboratively used for performing the vehicle gear control method provided by the embodiments of this disclosure.

If the vehicle 102 and the server 104 collaboratively perform the vehicle gear control method, the vehicle 102 may collect driving scene images through an on-board camera and send the driving scene images to the server 104; and then, the server 104 performs image recognition on the driving scene images to obtain driving scene labels. The server 104 generates a corresponding target gear shifting mode based on a driving scene label, a driving status of the vehicle 102 and driving behavior data of the vehicle 102, and sends the target gear shifting mode to the vehicle 102, thus enabling the vehicle 102 to drive according to a target gear shifting mode during driving. The server 104 may be implemented by using an independent server or a server cluster that includes a plurality of servers.

If the vehicle 102 side separately performs the vehicle gear control method, the vehicle 102 may collect driving scene images through the on-board camera and performs the image recognition on the driving scene images to obtain the driving scene labels. The vehicle 102 acquires own driving status and driving behavior data, generates a target gear shifting mode including target gear shifting time and a target gear according to the driving scene label, the driving status data and the driving behavior data, and based on the target gear shifting mode, drives according to the target gear at the target gear shifting time.

It is to be noted that the method may be applied to vehicles, servers, and electronic devices. The electronic devices include, but are not limited to, mobile phones, computers, intelligent voice interaction devices, intelligent household appliances, vehicle terminals, air vehicles, etc.

It is to be understood that, the "first", the "second", and similar terms used in this disclosure do not indicate any order, quantity or significance, but are used to only distinguish different components. Unless the paper indicates clearly, "one", "a", or similar terms also do not indicate a quantity limitation, but indicates that there is at least one.

Figure 2:
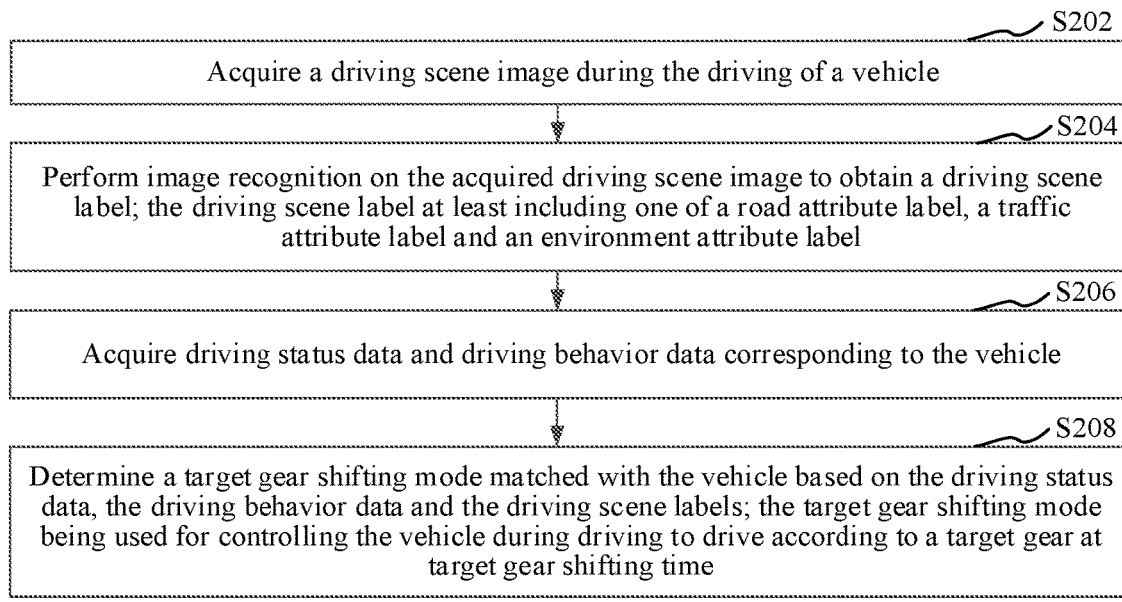
FIG. 2 is a schematic flowchart of the vehicle gear control method according to an embodiment.

In one or more embodiments, as shown in FIG. 2, a vehicle gear shifting method is provided. It may be easily understood that the vehicle gear shifting method may be performed by a computer device. Specifically, the computer device may be the aforementioned electronic device, vehicle or server. For better description, the method applied to the vehicle in FIG. 1 will be described below as an example, including the following steps:

Step S202: Acquire driving scene images during the driving of a vehicle. For example, a driving scene image is acquired while a vehicle is driving.

The driving scene image is an image obtained by collecting scene information of a current driving area where a running vehicle is located. The running vehicle is a vehicle that is in motion.

Specifically, if the vehicle is in motion, driving scene images around the vehicle may be collected by an image collection apparatus. In one or more embodiments, the image collection apparatus may collect the driving scene images according to a preset collection frequency. In addition, in each time of collection, at least one driving scene image is collected for the current driving area.

In one or more embodiments, scenes of the driving area where the vehicle is located may be photographed by an on-board camera to obtain driving scene images; the scenes of the driving area may also be photographed by a camera externally connected to the vehicle to obtain the driving scene images; and the surrounding environment of the vehicle may also be photographed by a surveillance camera mounted in the driving area to obtain the driving scene images. It is not limited in this embodiment.

In one or more embodiments, the acquiring a driving scene image during the driving of a vehicle includes: during the driving of the vehicle, collecting scene information around the vehicle in real time by the on-board camera deployed on the vehicle to obtain at least one driving scene image.

Specifically, the image collection apparatus specifically may be the on-board camera. The driving scene images collected from the running vehicle may be collected by the on-board camera arranged on the vehicle. A plurality of on-board cameras may be arranged at different positions of the vehicle according to the requirements of image acquisition. For example, an image collection direction of the on-board camera for collecting a road surface environment of a lane is different from that of the on-board camera for collecting weather conditions; and the image collection direction of the on-board camera for collecting weather conditions is different from that of the on-board camera for collecting traffic signs. In other embodiments, the driving scene images may be collected by a rotary image capturing apparatus with a controllable collection direction.

After the scenes around the vehicle are collected in real time, a target gear shifting mode of the vehicle can be timely determined by the real-time collected driving scene images, thus improving the timeliness of determining the target gear shifting mode.

In one or more embodiments, a first on-board camera for collecting road images, a second on-board camera for collecting images of traffic participants and a third on-board camera for collecting weather images may be mounted on the vehicle. The traffic participants are pedestrians, motor vehicles and non-motor vehicles in the driving area.

Step S204: Perform image recognition on the acquired driving scene image to obtain a driving scene label; the driving scene label at least including one of a road attribute label, a traffic attribute label and an environment attribute label. For example, image recognition is performed on the acquired driving scene image to obtain a driving scene label including at least one of a road attribute label, a traffic attribute label, or an environment attribute label.

The term "at least one of" may include any one or a combination of the listed elements.

The driving scene label is information indicating a scene condition of a driving scene in the driving area. The driving scene label includes a road attribute label, a traffic attribute label and an environment attribute label. The road attribute label is information indicating a road condition of the current driving area where the running vehicle is located. For example, the road attribute label may be "large upslope", "small upslope", "straight road", "even road surface", etc. The traffic attribute label is information indicating a traffic condition of the current driving area where the running vehicle is located. For example, the traffic attribute label may be "traffic jam", "high danger level", etc. The environment attribute label is information indicating an environmental condition of the current driving area where the running vehicle is located. For example, the environment attribute label may be "low road visibility", "strong light", etc.

Specifically, if the driving scene image is acquired, the vehicle may perform image recognition on the driving scene image to recognize the road condition, traffic condition and environment condition in the driving scene image, and output the corresponding road attribute label, traffic attribute label and environment attribute label based on the road condition, the traffic condition and the environment condition.

In one or more embodiments, the vehicle may recognize a road in the driving scene image through a road recognition algorithm, recognize a traffic condition in the driving scene image by a traffic recognition algorithm, and recognize an environment condition in the driving scene image by an environment recognition algorithm. The traffic recognition algorithm, the traffic recognition algorithm and the environment recognition algorithm may be customized according to requirements, such as an OpenCV road detection algorithm and a traffic recognition algorithm based on Matlab.

In one or more embodiments, performing image recognition on the acquired driving scene image to obtain a driving scene label includes: acquiring a scene classification model; extracting image features in the driving scene image by the scene classification model; the image features including road features, traffic features, and environment features; based on the road features, the traffic features, and the environment features, determine a road attribute label, a traffic attribute label and an environment attribute label that correspond to the driving scene image by the scene classification model.

The scene classification model is a machine learning model for outputting the driving scene label. Machine-learned models can include linear models and non-linear models. As an example, machine-learned models can include regression models, support vector machines, decision tree-based models, and/or neural networks (e.g., deep neural networks). For example, neural networks can include feed-forward neural networks, recurrent neural networks (e.g., long short-term memory recurrent neural networks), convolutional neural networks or other forms of neural networks. It is to be noted that the scene classification model is not necessarily limited to a neural network and may also include other forms of machine learning models.

The image features are data that may reflect scene features around the vehicle. The image features include road features, traffic features, and environment features. The road features are data used for reflecting road features in the driving scene, and may reflect color value distribution, brightness value distribution, and depth distribution of pixels of a road surface and road facilities. The traffic features are data for reflecting traffic participant features in the driving scene, and may reflect one or more types of feature information such as distances among pedestrians, motor vehicles and non-motor vehicles. The environment features are data for reflecting environment features in the driving scene, and may reflect brightness distribution and depth distribution of pixels such as sky and trees.

Specifically, if the driving scene image is acquired, the vehicle may input the driving scene image into the scene classification model, encode the driving scene image by the scene classification model to obtain an encoding result, and extract the road features, traffic features, and environment features in the driving scene image according to the encoding result. Further, the scene classification model encodes the road features, the traffic features, and the environment features to obtain a road attribute label, a traffic attribute label and an environment attribute label that correspond to the driving scene image.

Figure 3:
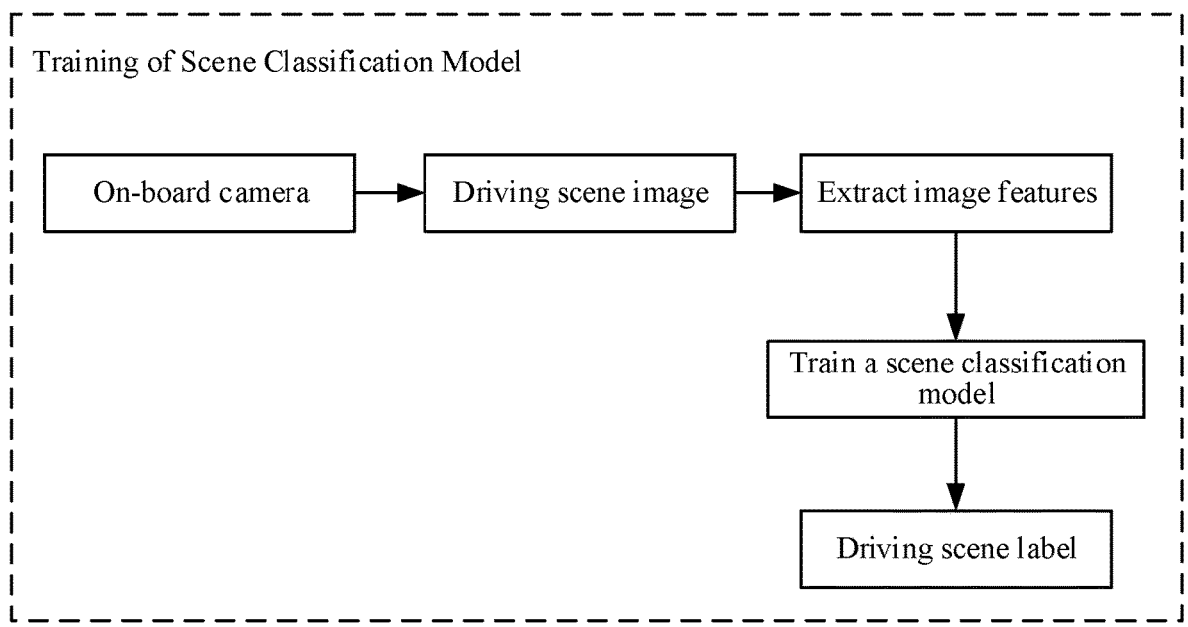
FIG. 3 is a schematic diagram of training of a scene classification model according to an embodiment.

In one or more embodiments, referring to FIG. 3, an on-board camera may be mounted on the vehicle in advance, and may be used for collecting a plurality of driving scene images in different driving scenes. For example, the on-board camera may be used for collecting a driving scene image of an upslope road in rainy days; collecting a driving scene image of a bend road in sunny days; and collecting a driving scene image of a congested road in snowy days, etc. Further, a model trainer may label the collected driving scene images, obtain corresponding training samples by labeling, and perform model training on the scene classification model by the training samples until training stopping conditions are met to obtain a trained scene classification model. FIG. 3 is a schematic diagram of training of a scene classification model according to an embodiment.

In the aforementioned embodiment, the scene classification model may be trained in advance, such that the trained scene classification model may extract image features in all directions. Therefore, a multidimensional driving scene label may be outputted based on the extracted image features, and furthermore, a target gear shifting mode of the vehicle may be obtained exactly based on the multidimensional driving scene label.

Step S206: Acquire driving status data and driving behavior data corresponding to the vehicle. For example, driving status data and driving behavior data corresponding to the vehicle are acquired. The driving status data may indicate at least one of vehicle speed or vehicle acceleration and the driving behavior data may indicate at least one of a brake control input, an accelerator control input, or a throttle opening degree.

The driving status data is vehicle condition data of the vehicle in running. In one or more embodiments, the driving status data includes one or a combination of more of parameters such as a vehicle type, a vehicle speed, and a vehicle acceleration. The vehicle type is a parameter for describing the size of the vehicle, and specifically may be a vehicle model, etc. The vehicle speed is speed data of the vehicle in running, and the vehicle acceleration is a speed change rate of the vehicle in running.

The driving behavior data is control data based on which a vehicle driving object controls the current vehicle. In one or more embodiments, the driving behavior data includes one or a combination of more of parameters such as a brake pedal depression degree, an accelerator pedal depression degree and a throttle opening degree. The driving object is a driver who drives the vehicle. It can be understood that the driver specifically may be a real person or a robot for automatic system control. The throttle opening degree is an opening angle of an engine throttle. The throttle opening degree of the vehicle may be manipulated by the driving object through an accelerator pedal to change air intake of an engine to control the operation of the engine. Different throttle opening degrees indicate different operating conditions of the engine.

Specifically, the vehicle may determine the vehicle speed and the vehicle acceleration through a vehicle speed sensor and an acceleration sensor that are mounted inside the vehicle, and determine the accelerator pedal depression degree, the brake pedal depression degree and the throttle opening degree through an accelerator pedal sensor, a brake pedal sensor and an engine throttle sensor that are mounted inside the vehicle.

In one or more embodiments, the vehicle may directly determine a corresponding vehicle speed by reading instrument board data on an instrument board of the vehicle.

In one or more embodiments, the vehicle may acquire the driving status data and driving behavior data in real time, may also acquire the driving state data and driving behavior data every preset time, and may also acquire the driving state data and driving behavior data when it is determined that the driving object steps on an accelerator pedal or a brake pedal. It is not limited in this embodiment.

Step S208: Determine a target gear shifting mode matched with the vehicle based on the driving status data, the driving behavior data, and the driving scene label; the target gear shifting mode being used for controlling the vehicle during driving to drive according to a target gear at target gear shifting time. For example, a gear shifting mode is determined based on the driving status data, the driving behavior data, and the driving scene label. The gear shifting mode may control the vehicle to drive according to a corresponding gear at a corresponding gear shifting time.

The target gear shifting mode includes the target gear and the target gear shifting time. The target gear shifting time is gear shifting time during which the gear of the vehicle is shifted from an original gear to the target gear. The target gear is a gear matched with the driving status data of the current vehicle, the driving behavior data of the current driving object, and the driving scene label of the current driving environment.

Specifically, the vehicle generates a corresponding target gear shifting mode according to the driving status data, the driving behavior data and the driving scene label, and adjust the gear to the target gear at the target gear shifting time to drive according to the target gear.

In one or more embodiments, if the vehicle determines that a front driving area is dangerous based on the driving scene label, for example, determines that a road ahead is an accident-prone area or a sharp bend, the vehicle sets the target gear shifting time as "before the driving object steps on the brake pedal". As a result, a driver can prepare to downshift and slow down in advance before stepping on the brake pedal, thereby shortening the time for switching and synchronizing a clutch.

In one or more embodiments, the vehicle may determine the target gear shifting time according to the response time of the driving object. The response time of the driving object is a duration during which the driving object responds to sudden situations. Generally, in the case of unmanned driving, the response time of the driving object is related to a processor analysis speed of the vehicle; and in the case of manned driving, the response time of the driving object may be obtained by recognizing the identity of a driver, acquiring historical driving data of the driver, and analyzing response data in the historical driving data. If the vehicle determines that the front driving area is dangerous based on the driving scene label, the vehicle acquires a determined point in time of the driving scene label and adds the determined point in time to the response time to obtain a gear shifting time limit. The target gear shifting time is set to any time in point from the determined point in time to the gear shifting time limit, so that the driving object can prepare to downshift before stepping on the brake pedal. The determined point in time is a time in point at which the driving scene label is generated.

In one or more embodiments, if the vehicle determines that the front driving area is a slow-moving area based on the driving scene label, for example, determines that the road ahead is congested, a large upslope or a sharp bend based on the driving scene label, it is necessary to avoid frequent gear shifting, thereby avoiding a situation that the transmission upshifts due to the driving object stepping on the accelerator pedal. If the driving object steps on the brake pedal or accelerator pedal at the current moment, based on the principle of "reducing the number of times of gear shifting", the vehicle determines whether the driving object steps on the brake pedal or the accelerator pedal within a preset duration from a moment prior to the current moment. If the driving object does not step on the brake pedal or accelerator pedal within the preset duration, it may be considered that the operation that the driving object steps on the brake pedal or accelerator pedal at this time is not a misoperation. Therefore, the vehicle adds the current moment to the preset duration to obtain the target gear shifting time, and drives within the target gear shifting time according to the target gear.

If the driving object steps on the brake pedal or accelerator pedal within the preset duration, it may be considered that the driving object steps on the brake pedal or accelerator pedal for many times within short time. Furthermore, it may be considered that the operation that the driving object steps on the brake pedal or accelerator pedal at the current moment is a misoperation. At this time, the vehicle ignores this operation that the driver steps on the brake pedal, and keeps the current gear not shifted. For example, if the driving area is a large upslope, ideally, the vehicle needs to keep moving in 1st gear or 2nd gear at a constant speed. Therefore, in order to avoid a condition that the transmission upshifts due to the driving object stepping on the accelerator pedal, based on the principle of "reducing the number of times of gear shifting", the vehicle may determine that the driving object repeatedly stepping on the accelerator pedal or the brake pedal within short time as a misoperation, and avoid frequent gear shifting by not responding to the misoperation of the driving object, thereby improving the fuel economy of the vehicle.

In one or more embodiments, the driving object may install a gear decision-making system in the vehicle. If the driving status data, the driving behavior data, and the driving scene label are acquired, the vehicle may input them into the gear decision-making system, and determine a target gear shifting mode matched with the vehicle by means of a membership function of the gear decision-making system. Input parameters of the membership function may be the driving status data, the driving behavior data, and the driving scene labels, and output data thereof may be the target gear shifting mode matched with the vehicle.

In one or more embodiments, the vehicle may acquire data of multiple times of test drives of a professional driving object in different preset driving scenes, and perform data analysis on the data of multiple times of test drives to obtain the membership function of the gear decision-making system, which may be used for determining the target gear shifting mode of the vehicle according to the driving status data, the driving behavior data, and the driving scene label of the vehicle. The professional driving object is a driver who can skillfully drive the vehicle. The professional driving object can drive the vehicle in a preset driving scene, and record a driving mode used while driving in the preset driving scene. The preset driving scene and the corresponding driving mode are used as test drive data, and a corresponding membership function is determined based on the data. For example, the professional driving object can drive the vehicle to climb up for many times, and determine a gear and gear shifting time used in each climb, which are used as the test drive data.

In one or more embodiments, the vehicle may determine the target gear shifting mode matched with the vehicle by a gear shifting mode determination model based on the driving status data, the driving behavior data, and the driving scene label. The gear shifting mode determination model is a machine learning model obtained by training based on the driving status data, the driving behavior data, and the driving scene label, and the corresponding target gear shifting mode.

Prior to the outputting of the target gear shifting mode by the gear shifting mode determination model, developers may acquire a large amount of test drive data, and add a gear shifting mode label to a corresponding driving scene image by the test drive data to obtain training data. For example, if the test drive data are gears and gear shifting time used in climbing, the developers may acquire climbing driving scene images collected by the vehicle during climbing, and label the climbing driving scene images based on the gears and gear shifting time used in climbing to obtain training data. Further, the gear shifting mode determination model may be trained by the training data until training stopping conditions are met.

In one or more embodiments, the on-board camera may collect driving scene images according to a preset collection frequency. If the difference between a current driving scene label of a driving scene image collected at a current point in time for collection, and a subsequent driving scene label of a driving scene image collected at a next sequential point in time for collection is less than a difference threshold, the vehicle keeps a target gear shifting mode corresponding to the current driving scene label unchanged.

In one or more embodiments, the vehicle may be adjusted to a target gear from an original gear by a dual clutch automatic transmission. The dual clutch automatic transmission includes 2 clutches, the first clutch controls odd gears and reverse gear and the second clutch controls even gears. If a gear shift lever engages an odd gear, the first clutch is connected to a first input shaft and the first input shaft works; and the second clutch is disengaged and a second input shaft does not work. Similarity, if the gear shift lever engages an even gear, the second clutch is connected to the second input shaft and the first second clutch is disengaged from the first input shaft. In this way, two gears are always engaged during the whole working process, when one is working, the other one is ready for a next gear shift.

Based on the working principle, the dual clutch automatic transmission needs to be in half clutch for a long time, which leads to that the dual clutch automatic transmission is overheated, even stops working. Especially, when the vehicle is in the starting stage or below a certain speed in traffic congestion situations, the dual clutch automatic transmission is always in a slipping state, and the engine speed and torque output will be increased in order to obtain the starting power, which also results in the rapid temperature rise of the dual clutch automatic transmission and the rapid acceleration of the vehicle. In related control policies, the dual clutch automatic transmission is completely disengaged for protection, which in turn results in power interruption, such that the dual clutch automatic transmission jitters and jerks seriously and has poor ride comfort.

In one or more embodiments, after driving scenes during driving are accurately recognized, more reliable environment information may be provided for the vehicle based on these accurately recognized driving scenes, so that the vehicle may generate a more reasonable target gear shifting mode based on such information. This ensures that the dual clutch automatic transmission may reasonably select whether to shift gears, shift to which gear and when to shift gears while the vehicle starts on congested roads and drives on bends, abrupt slopes and slippery roads. Therefore, the problems of power interruption and strong jerking of the vehicle, caused by design issues of the dual clutch automatic transmission, are solved.

In the aforementioned vehicle gear control method, after the driving scene image is acquired during driving, image recognition may be performed on the image to obtain the corresponding driving scene label. After the driving status data and the driving behavior data are acquired, the target gear shifting mode matched with the vehicle may be determined based on the driving status data, the driving behavior data and the driving scene label. In this way, the vehicle during driving may be controlled to drive according to the target gear at the target gear shifting time. Since the target gear shifting mode is determined by integrating the driving status data, the driving behavior data and the driving scene label, the accuracy of determining the target gear shifting mode is improved.

In one or more embodiments, the scene classification model includes a first road model related to roads, a first traffic model related to traffic, and a first environment model related to environments; the first road model at least includes one of a road slope model, a bend curvature model, a road surface adhesion model, a road surface evenness model, a traffic light model, and a traffic sign model; the first traffic model at least includes one of a danger level model and a congestion condition model; the first environment model at least includes one of a road visibility model, a weather condition model, and a light intensity model; the road attribute label at least includes one of a road slope label outputted by the road slope model, a bend curvature label outputted by the bend curvature model, a road surface adhesion label outputted by the road surface adhesion model, a road surface evenness label outputted by the road surface evenness model, a traffic light label outputted by the traffic light model, and a traffic sign label outputted by the traffic sign model; the traffic attribute label at least includes one of a danger level label outputted by the danger level model and a congestion condition label outputted by the congestion condition model; and the environment attribute label at least includes one of a road visibility label outputted by the road visibility model, a weather condition label outputted by the weather condition model, and a light intensity label outputted by the light intensity model.

Specifically, the scene classification model may include a first road model related to roads, a first traffic model related to traffic, and a first environment model related to environments. The vehicle may output a road attribute label by the first road model; output a traffic attribute label by the first traffic model; and output an environment attribute label by the first environment model.

Figure 4:
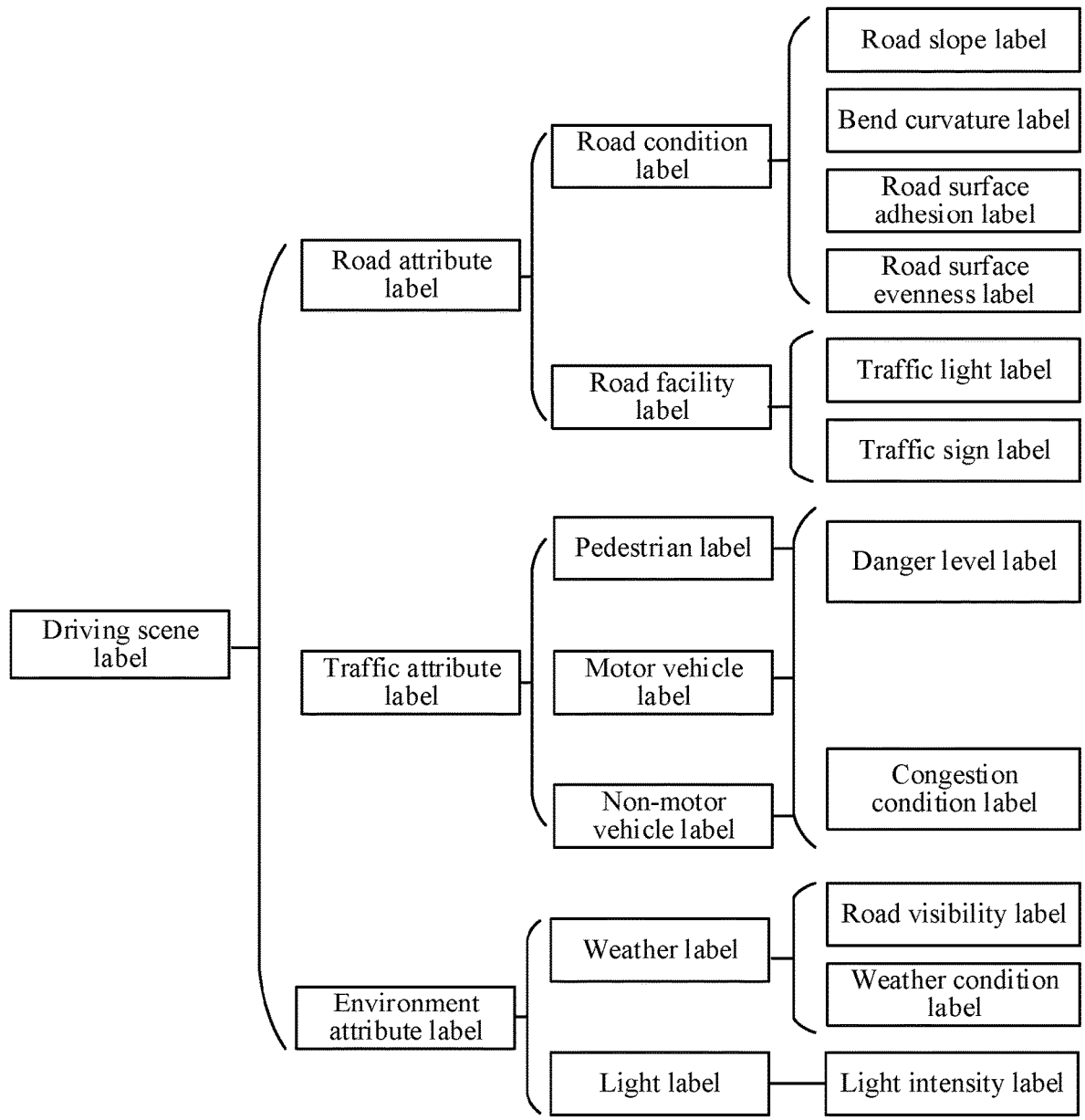
FIG. 4 is a schematic diagram of a driving scene label according to an embodiment.

Further, referring to FIG. 4, the first road model may also include a road slope model, a bend curvature model, a road surface adhesion model, a road surface evenness model, a traffic light model, and a traffic sign model. The vehicle may output a road slope label by the road slope model; output a bend curvature label by the bend curvature model; output a road surface adhesion label by the road surface adhesion model; output a road surface evenness label by the road surface evenness model; output a traffic light label by the traffic light model; and output a traffic sign label by the traffic sign model.

The road slope label is information indicating a road slope condition in the driving area, and specifically may be "large upslope", "small upslope", "even road", "small downslope", "large downslope", etc. The bend curvature label is information indicating a bend curvature condition of the driving area, and specifically may be "straight road", "bend", "sharp bend", etc. The road surface adhesion label is information indicating a road surface adhesion condition of the driving area, for example, specifically may be "low adhesion", "moderate adhesion", "high adhesion", etc. The road surface evenness label is information indicating a road surface evenness condition of the driving area, and specifically may be "even road surface", "bumpy road surface", etc. The traffic light label is information indicating traffic lights of the driving area, and specifically may be "red light", "yellow light", "green light", etc. The traffic sign label is information indicating traffic signs existing in the driving area, and specifically may be "school ahead", "zebra crossing ahead", "accident-prone area ahead", etc.

Further, the first traffic model includes a danger level model and a congestion condition model. The vehicle may output the danger level label based on a danger level recognition result, and output a congestion condition label by the congestion condition model.

The danger level label is information indicating a traffic danger level of the driving area, and specifically may be "high danger", "moderate danger", or "low danger", etc. The congestion condition label is information indicating a traffic congestion condition of the driving area, and specifically may be "high congestion", "moderate congestion", or "low congestion", etc.

Further, the first environment model includes a road visibility model, a weather condition model, and a light intensity model. The vehicle may output the road visibility label by the road visibility model, a weather condition label by the weather condition model, and the light intensity label by the light intensity model.

The road visibility label is information indicating the road visibility in the driving area, and specifically may be "high visibility", "moderate visibility", and "low visibility". The weather condition label is information indicating a current weather condition, and specifically may be "sunny", "rainy", "snowy", "foggy", etc. The light intensity label is information indicating the light intensity of the driving area, and specifically may be "strong light", "moderate light", "weak light", etc. FIG. 4 illustrates a schematic diagram of a driving scene label according to an embodiment.

In one or more embodiments, the danger level model may integrate a danger level by pedestrian dimension, a danger level by motor vehicle dimension, and a danger level by non-motor vehicle dimension to output a danger level label corresponding to the driving scene image. Specifically, the danger level model may recognize pedestrians, motor vehicles and non-motor vehicles in a driving scene image to obtain recognition results, determine danger levels of the pedestrians, the motor vehicles and the non-motor vehicles in the driving area according to the recognition results, and integrate the danger levels of the pedestrians, motor vehicles and non-motor vehicles in the driving area to obtain a danger level label corresponding to the driving scene image.

In one or more embodiments, the congestion condition model may integrate a congestion condition by pedestrian dimension, a congestion condition by motor vehicle dimension, and a congestion condition by non-motor vehicle dimension to output a congestion condition label corresponding to the driving scene image. Specifically, the congestion condition model may recognize pedestrians, motor vehicles and non-motor vehicles in a driving scene image to obtain recognition results, determine crowding levels of the pedestrians, the motor vehicles and the non-motor vehicles in the driving area according to the recognition results, and integrate the crowding levels of the pedestrians, the motor vehicles and the non-motor vehicles in the driving area to obtain a congestion condition label corresponding to the driving scene image.

In one or more embodiments, prior to image recognition performed on the driving scene image by the scene classification model, each model in the scene classification model may be trained to obtain a trained model.

In the aforementioned embodiment, since corresponding labels are outputted based on different models, the outputted labels are more accurate.

In one or more embodiments, the scene classification model includes a second road model, a second traffic model, and a second environment model; the road attribute label at least includes one of a road condition label and a road facility label; the road condition label at least includes one of a road slope label, a bend curvature label, a road surface adhesion label, and a road surface evenness label; the road facility label at least includes one of a traffic light label and a traffic sign label; the traffic attribute label at least includes one of a pedestrian label, a motor vehicle label, and a non-motor vehicle label; the pedestrian label at least includes one of a pedestrian danger level label and a pedestrian congestion condition label; the motor vehicle label at least includes one of a motor vehicle danger level label and a motor vehicle congestion condition label; the non-motor vehicle label at least includes one of a non-motor vehicle danger level label and a non-motor vehicle congestion condition label; the environment attribute label at least includes one of a weather label and a light label; the weather label at least includes one of a road visibility label and a weather condition label; the light label at least includes a light intensity label; based on the road features, the traffic features, and the environment features, determining a road attribute label, a traffic attribute label and an environment attribute label that correspond to the driving scene image by the scene classification model includes: based on the road features, outputting at least one of the road slope label, the bend curvature label, the road surface adhesion label, the road surface evenness label, the traffic light label, and the traffic sign label by the second road model; based on the traffic features, outputting at least one of the pedestrian danger level label, the pedestrian congestion condition label, the motor vehicle danger level label, the motor vehicle congestion condition label, the non-motor vehicle danger level label and the non-motor vehicle congestion condition label by the second traffic model; and based on the environment features, outputting at least one of the road visibility label, the weather condition label, and the light intensity label by the second environment model.

A multi-task model is a machine learning model that can process different tasks, and may improve the learning efficiency and quality of each task by learning relationships and differences among different tasks.

Specifically, the scene classification model may include a second road model, a second traffic model, and a second environment model. The vehicle may input a driving scene image into the second road model, extract road features in the driving scene image by the second road model, separately recognize roads and road facilities in the driving area according to the road features, and output a road condition label and a road facility label according to recognition results. The road condition label includes a road slope label, a bend curvature label, a road surface adhesion label, and a road surface evenness label; and the road facility label includes a traffic light label and a traffic sign label.

Further, the vehicle may input a driving scene image into the second traffic model, extract traffic features by the second traffic model, recognize pedestrians, motor vehicles and non-motor vehicles in the driving area according to the traffic features, and output a pedestrian label, a motor vehicle label, and a non-motor vehicle label according to recognition results. The pedestrian label includes a pedestrian danger level label and a pedestrian congestion condition label; the motor vehicle label includes a motor vehicle danger level label and a motor vehicle congestion condition label; and the non-motor vehicle label includes a non-motor vehicle danger level label and a non-motor vehicle congestion condition label.

Further, the vehicle may input a driving scene image into the second environment model, extract environment features by the second environment model, recognize weather and light in the driving area according to the second environment model, and output a weather label and a light label according to recognition results. The weather label includes a road visibility label and a weather condition label; and the light label includes a light intensity label.

A plurality of driving scene labels may be outputted by the multi-task model one time, so that the output efficiency of the driving scene labels is improved.

In one or more embodiments, determining a target gear shifting mode matched with the vehicle based on the driving status data, the driving behavior data, and the driving scene label includes: determining a corresponding candidate gear shifting mode based on the driving status data and the driving behavior data; and performing correction processing on the candidate gear shifting mode based on the driving scene label to obtain the target gear shifting mode matched with the vehicle.

Specifically, if the driving status data and the driving behavior data of the running vehicle are acquired, the vehicle may call a preset gear shifting schedule table and look up a candidate gear shifting mode corresponding to the acquired driving status data and driving behavior data from the gear shifting schedule table. The gear shifting schedule table is a table that stores corresponding relationship among the driving state data, the driving behavior data and the gear shifting mode, and specifically may be a gear shifting MAP image.

Further, when determining a driving scene label corresponding to the driving scene image, the vehicle may correct the candidate gear shifting mode based on the driving scene label and adjust the candidate gear shifting mode to a target gear shifting mode to trigger the vehicle to drive according to the target gear shifting mode.

In one or more embodiments, referring to FIG. 1, the vehicle may correct the candidate gear shifting mode according to a dynamic gear correcting logic in Table 1.

For example, if the driving scene label is "large upslope", the corresponding correcting logic is "Preset a downshift gear before climbing to avoid frequent gear shifting". At this time, the vehicle downshifts a candidate gear in the candidate gear shifting mode to a target gear, and adjusts the gear shifting time in the candidate gear shifting mode as "before the driving object steps on the brake pedal". The candidate gear shifting mode is corrected through the correcting logic, such that the vehicle can avoid frequent gear shifting during climbing. Therefore, the energy consumed by frequent gear shifting and component wear of a gear shifting actuator are reduced, and the loss of the economy and power of the vehicle due to a high proportion of power interruption time is also avoided. The target gear shifting time and a specific target gear required may be determined by the aforementioned membership function or by the aforementioned gear shifting mode. For example, a gear range and a gear shifting time range, which correspond to the driving scene label, may be determined through the membership function, and the candidate gear shifting mode may be adjusted to be within the gear range and the gear shifting time range to obtain the target gear and the target gear shifting time. The candidate gear shifting mode may be corrected based on a principle of least correction. For example, when the gear range is between 1st gear and 2nd gear, if a candidate gear in the candidate gear shifting mode is 3rd gear, the candidate gear is adjusted to the 2nd gear rather than the 1st gear. In this way, the driving safety of the vehicle can be improved.

For another example, if the driving scene label is "low road surface adhesion", the vehicle upshifts to the target gear according to the corresponding correcting logic "Prepare to uplift while shifting on a low-adhesion road surface to avoid excessive driving forces". Since a candidate gear is corrected by a correcting logic corresponding to the road surface adhesion, the possibility of dangerous accidents caused by sharp skidding due to insufficient adhesion forces between tires and a road surface when the vehicle is driving on the low-adhesion road surface can be prevented. In addition, the shift of low gears can also be reduced by using the correction logic on the low-adhesion road surface, thereby meeting the demands of the vehicle on adhesive rate and improving the fuel economy of the vehicle.

For still another example, when the driving scene label is "sharp bend", the vehicle takes "While ensuring the driving safety, shift on a bend based on downshifting and avoiding frequent gear shifting" as a correction logic to downshift the candidate gear to the target gear and avoid frequent gear shifting; recognizes a misoperation of a driving object while driving on the bend based on the operation that the driving object steps on the brake pedal or accelerator pedal; and avoids frequent gear shifting by not responding to the misoperation of the driving object.

For example, if the driving scene label is "high congestion", the vehicle takes "Downshift and keep the current gear if the speed is basically matched with the gear to avoid frequent gear shifting" as a correction logic to downshift the candidate gear to the target gear and avoid frequent gear shifting. By avoiding the frequent gear shifting, the probability that the dual clutch automatic transmission is in half clutch for long time can be reduced, thus prolonging the service life of the dual clutch automatic transmission and reducing jerking during driving.

TABLE 1

Table of Dynamic Gear Correction Logic

| Driving Scene Label | | | | Dynamic Gear Correction Logic | Priority |
|---|---|---|---|---|---|
| Road information | Road condition | Road slope | Large upslope/small upslope/even road/small downslope/large downslope | Prepare to downshift in advance before climbing, avoiding frequent gear shifting; Make | First priority |

TABLE 1-continued

Table of Dynamic Gear Correction Logic

| | | Driving Scene Label | | Dynamic Gear Correction Logic | Priority |
|---|---|---|---|---|---|
| | | | | full use of the drag action of an engine to control a vehicle speed on a downslope; | |
| | | Bend curvature | Straight road/bend/sharp bend | While ensuring the safety, shift on a bend based on a principle of downshifting and avoiding frequent gear shifting; | First priority |
| | | Road surface adhesion | Low adhesion/moderate adhesion/high adhesion | Prepare to upshift while shifting on a low-adhesion road surface to avoid excessive driving forces; | Second priority |
| | | Road surface evenness | Even/bumpy road surface | Prepare to slow down and downshift on a bumpy road surface; | Second priority |
| | Road facility | Traffic light | Red/green/yellow light | Keep unchanged when the light is green, and prepare to slow down when the light is red/yellow, and downshift and avoid frequent gear shifting | First priority |
| | | Traffic sign | School ahead/zebra crossing/accident-prone area | Recognize a warning sign, prepare to slow down, and downshift; | Second priority |
| Information of traffic participants | Geometric/motion attributes of pedestrians/motor vehicles/non-motor vehicles | Danger level | Low/moderate/high | Prepare to slow down and downshift when the danger level is moderate or high | First priority |
| | | Congestion grade | Low/moderate/high | Under the moderate/high congestion condition, downshift, and keep the current gear if the speed is basically matched with the gear to avoid frequent gear shifting | First priority |
| Environment information | Weather Light | Road visibility | Low/moderate/high | Prepare to slow down and downshift when the road visibility is low; | Third priority |
| | | Light intensity | Low/moderate/high | Prepare to slow down and downshift when the light intensity is high; | Third priority |

In the aforementioned embodiment, the correction processing is performed on the candidate gear shifting mode by the driving scene label, such that the corrected candidate gear shifting mode may integrate surrounding environment information, driving status information and driving behavior information, thus obtaining a more reasonable target gear shifting mode.

In one or more embodiments, determining a corresponding candidate gear shifting mode based on the driving status data and the driving behavior data includes: determining a target driving mode of the vehicle; acquiring a target gear shifting schedule table corresponding to the target driving mode; and looking up the corresponding candidate gear shifting mode from the target gear shifting schedule table based on the driving status data and the driving behavior data.

The driving mode is a driving way, and specifically may be a sports driving mode, a comfortable driving mode, an economical driving mode, an off-road driving mode, etc. Under different driving modes, the vehicle may correspondingly adjust responses including steering, a gearbox, an engine, a suspension, and the like, and the participation time and intensity of an electronic stability program according to predetermined parameters. Specifically, the vehicle may determine a current target driving mode, acquire a target gear shifting schedule table corresponding to the current target driving mode, and look up a candidate gear shifting mode corresponding to driving status data and driving behavior data from the gear shifting schedule table. The target driving mode is a driving mode of the vehicle at the current moment.

In one or more embodiments, gear shifting schedule tables corresponding to all driving models may be stored in the vehicle in advance. For determining the target driving mode of the vehicle, the vehicle may look up the target gear shifting schedule table from the stored multiple gear shifting schedule tables according to a mode identifier of the target driving mode.

In the aforementioned embodiment, after the target gear shifting schedule table corresponding to the target driving mode is acquired, a candidate gear shifting mode may be accurately determined based on the target gear shifting schedule table.

In one or more embodiments, the target gear shifting mode includes a target gear and target gear shifting time; performing correction processing on the candidate gear shifting mode based on the driving scene label to obtain a target gear shifting mode matched with the vehicle includes: determining a gear range and a gear shifting time range, which correspond to the driving scene label, the driving status data and the driving behavior data; in a case that a candidate gear in the candidate gear shifting mode exceeds the gear range, adjusting the candidate gear according to the gear range to obtain a target gear matched with the vehicle; and in a case that candidate gear shifting time in the candidate gear shifting mode exceeds the gear shifting time range, adjusting the candidate gear shifting time according to the gear shifting time range to obtain the target gear shifting time matched with the vehicle.

Specifically, while determining the driving scene label, the driving status data and the driving behavior data, the vehicle may determine a gear range and a gear shifting time range, which correspond to the driving scene label, the driving status data and the driving behavior data, by the membership function of the gear decision-making system. Further, the vehicle determines whether a candidate gear in the candidate gear shifting mode exceeds the gear range. If so, the candidate gear is adjusted to be within the gear range to obtain the target gear. For example, if the gear range is from the 1st gear to the 2nd gear, the vehicle gear may be corrected to the 2nd gear or the 1st gear from the 3rd gear when the candidate gear is the 3rd gear. Further, the vehicle determines whether candidate gear shifting time in the candidate gear shifting mode exceeds the gear shifting range. If so, the candidate gear shifting time is adjusted to be within the gear shifting time range to obtain the target gear shifting time.

Figure 5:
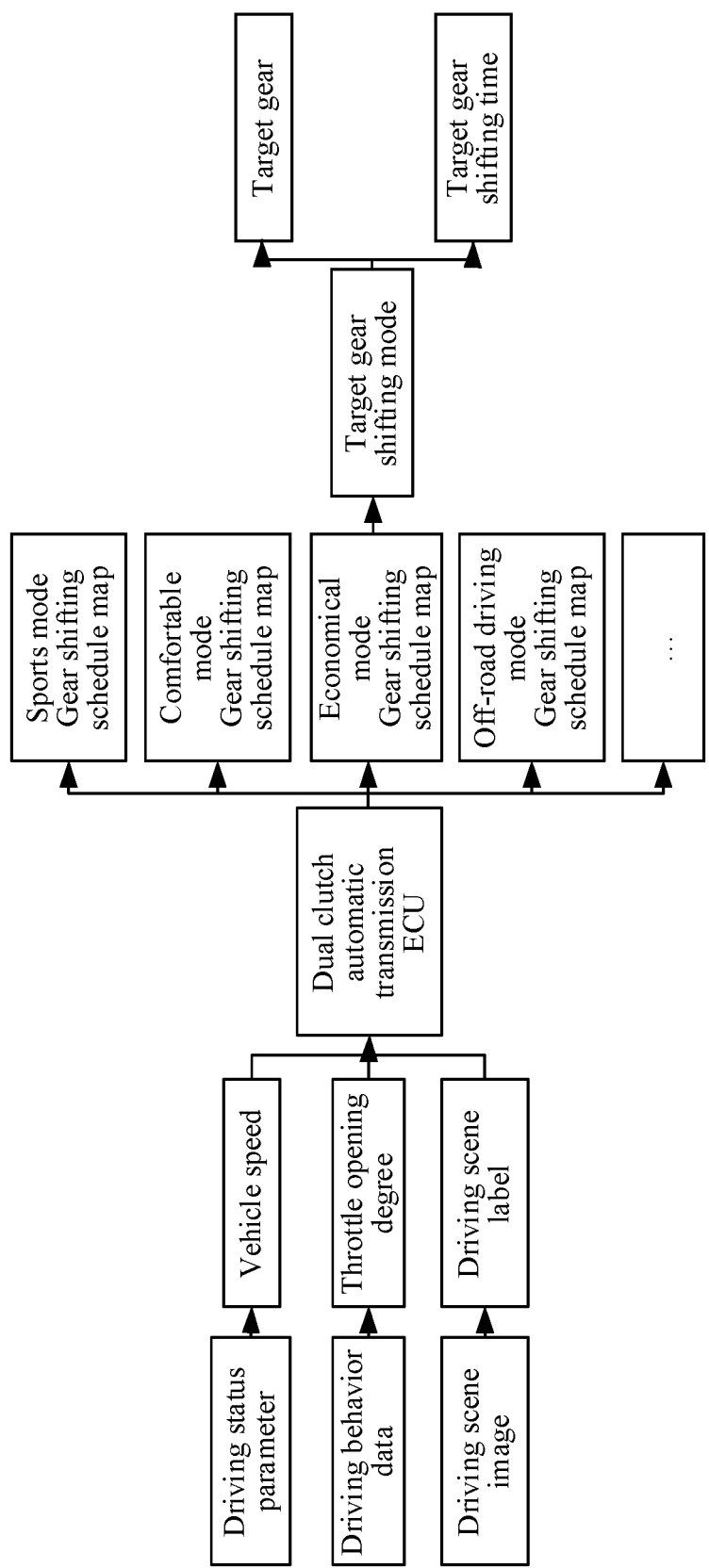
FIG. 5 is a schematic diagram of determination of a target gear shifting mode based on a target driving mode according to an embodiment.

In one or more embodiments, referring to FIG. 5, if vehicle speed, throttle opening degree and driving scene labels are acquired, the vehicle may determine a current target driving mode and determine a corresponding target gear shifting schedule table based on the target driving mode. Further, the vehicle may look up a candidate gear shifting mode corresponding to a vehicle speed and a throttle opening degree from the target gear shifting schedule table, correct the candidate gear shifting mode through the driving scene label to obtain a target shifting gear and target gear shifting time, and control the dual clutch automatic transmission to shift from the original gear to the target gear within the target gear shifting time. FIG. 5 illustrates a schematic diagram of determination of a target gear shifting mode based on a target driving model according to an embodiment.

In the aforementioned embodiment, correction processing is performed on the candidate gear shifting mode, such that the finally determined target gear shifting mode can be more accurate and reasonable.

In one or more embodiments, there are a plurality of driving scene images and the time for collecting the plurality of driving scene images is consecutive; the vehicle gear control method further includes: determining a label difference between the driving scene labels corresponding to each driving scene image in the plurality of driving scene images; determining the number of driving scene labels having the label difference less than or equal to a preset difference threshold; in a case that the number is greater than or equal to a preset number threshold, controlling the vehicle during driving through the target gear shifting mode to drive according to the target gear at the target gear shifting time.

Specifically, the on-board camera may collect driving scene images according to a preset collection frequency, and collect a plurality of consecutive driving scene images in each time of collecting the driving scene images. The vehicle may perform image recognition on each driving scene image in the plurality of consecutive driving scene images to obtain a corresponding driving scene label. Further, the vehicle determines a label difference among all driving scene labels, and determines whether the label difference is less than or equal to a preset difference threshold. In a case that there are a preset number of driving scene labels having the difference less than or equal to the preset difference threshold, for example, there are 10 driving scene images having a difference less than or equal to the preset difference threshold, it may be considered that a recognition result of the driving scene images by the scene classification model is more accurate, and the confidences of the driving scene labels are higher. At this time, in response to the target gear shifting mode, the vehicle during driving is controlled through the target gear shifting mode to drive according to the target gear at the target gear shifting time. In one or more embodiments, the vehicle may record the driving scene images having a label difference less than or equal to the preset difference threshold, so that the number of the driving scene images having a label difference less than or equal to the preset difference threshold is determined according to a recording result.

In one or more embodiments, the vehicle may determine a corresponding target gear shifting mode through the first driving scene image in the plurality of consecutive driving scene images; determine the accuracy of recognition results for the driving scene images by the scene classification model through the remaining driving scene images other than the first driving scene image in the plurality of consecutive driving scene images, that is, the confidence of the driving scene labels is also determined; and control the vehicle during driving through the target gear shifting mode to drive according to the target gear at the target gear shifting time when the confidence of the driving scene labels is higher than a preset confidence threshold.

In one or more embodiments, the vehicle may perform image recognition on the plurality of consecutive driving scene images by the scene classification model to obtain a driving scene label corresponding to each driving scene image. The vehicle determines a label difference among all driving scene labels; if there are a preset number of driving scene labels having a difference less than or equal to a preset difference threshold, screens a target driving scene label having the difference among the driving scene labels less than or equal to the preset difference threshold from the driving scene labels; and determines a target gear shifting mode according to the target driving scene label, the driving status data, and the driving behavior data.

In the aforementioned embodiment, the driving of the vehicle is controlled based on the target gear shifting mode only if there are a preset number of the driving scene labels having the difference less than or equal to the preset difference threshold. This can improve the safety of vehicle gear control and reduce the probability that the vehicle is in a dangerous state due to incorrect driving scene labels.

In one or more embodiments, the vehicle gear control method further includes: determining label confidences corresponding to the road attribute label, the traffic attribute label, and the environment attribute label, respectively; and in a case that the label confidences corresponding to the road attribute label, the traffic attribute label, and the environment attribute label, respectively are greater than or equal to a preset confidence threshold, controlling the vehicle during driving through the target gear shifting mode to drive according to the target gear at the target gear shifting time.

Specifically, in a case that the scene classification model outputs the road attribute label, the traffic attribute label, and the environment attribute label, the label confidences corresponding to the road attribute label, the traffic attribute label, and the environment attribute label, respectively may be correspondingly outputted. The vehicle determines whether the label confidences corresponding to the road attribute label, the traffic attribute label, and the environment attribute label are greater than or equal to the preset confidence threshold. If so, it may be considered that the accuracy of the driving scene labels obtained by the driving scene images is higher. At this time, the vehicle during driving is controlled through the target gear shifting mode to drive according to the target gear at the target gear shifting time. In a case that there is a driving scene label having a label confidence less than or equal to the confidence threshold, it may be considered that the target gear shifting mode is incorrect. At this time, the vehicle stops driving according to the target gear at the target gear shifting time.

In the aforementioned embodiment, the driving of the vehicle is controlled based on the target gear shifting mode only if the label confidences corresponding to the road attribute label, the traffic attribute label, and the environment attribute label are greater than or equal to the preset confidence threshold. This can improve the safety of vehicle gear control and reduce the probability that the vehicle is in a dangerous state due to incorrect driving scene labels.

In one or more embodiments, determining a target gear shifting mode matched with the vehicle based on the driving status data, the driving behavior data, and the driving scene label includes: determining a label priority of each driving scene label corresponding to the driving scene image; determining a label confidence of each driving scene label corresponding to the driving scene image; based on the label priority and the label confidence, screening a target driving scene label from the driving scene labels corresponding to the driving scene images; and determining the target gear shifting mode matched with the vehicle according to the target driving scene label, the driving status data, and the driving behavior data.

Specifically, the label priority corresponding to each driving scene label may be preset in advance, for example, the priority of "large upslope" may be set to the first priority, the priority of "low adhesion" may be set to the second priority, and the priority of "high light" may be set to the third priority. The first priority being greater than the second priority, the second priority being greater than the third priority. In a case that at least one driving scene label corresponding to the driving scene image is acquired, the vehicle may determine the label priority corresponding to each driving scene label and the label confidence corresponding to each driving scene label; screen candidate driving scene labels having the highest priority from the driving scene labels; screen a target driving scene label having the highest confidence from the candidate driving scene labels; and determine a target gear shifting mode corresponding to the vehicle based on the target driving scene label, the driving status data, and the driving behavior data.

For example, in a case that the driving scene labels corresponding to the driving scene images are "large upslope", "red light" and "low adhesion", the priority of "large upslope" is the first priority and the confidence thereof is 90%, the priority of "red light" is the first priority and the confidence thereof is 70% and the priority of "low adhesion" is the second priority and the confidence thereof is 95%, the vehicle may screen (e.g., select) the labels with the first priority, such as "large upslope" and "red light", from the driving scene labels based on the label priority, and screen the target driving scene label "large upslope" from the labels "large upslope" and "red light" based on the confidence.

In one or more embodiments, while acquiring each driving scene label, the vehicle may determine the label priority corresponding to each driving scene label based on Table 1. For example, in a case that the priority corresponding to the correcting logics "Prepare to downshift in advance before climbing, avoiding frequent gear shifting; make full use of the drag action of an engine to control a vehicle speed on a downslope" is the first priority, the label priority corresponding to the labels "large upslope", "small upslope", "small downslope" and "large downslope" may be the first priority.

In the aforementioned embodiment, the target driving scene labels are screened from the driving scene labels through the label priority and the label confidence, and the corresponding target gear shifting mode is determined according to the target driving scene labels, such that the vehicle can use a more reasonable target gear shifting mode to drive.

In one or more embodiments, the vehicle gear control method further includes: determining a current gear of the vehicle; and in a case that a target gear in the target gear shifting mode is inconsistent with a current gear, adjust the current gear of the vehicle to the target gear at the target gear shifting time to control the vehicle to drive according to the target gear at the target gear shifting time.

Specifically, the vehicle determines the current gear and determines whether the current gear is consistent with the target gear in the target gear shifting mode. If so, the current gear keeps unchanged; otherwise, the current gear of the vehicle is adjusted to the target gear at the target gear shifting time to control the vehicle to drive according to the target gear at the target gear shifting time.

Since the gear is shifted only if the target gear in the target gear shifting mode is inconsistent with the current gear, the number of times of unnecessary gear shifting can be reduced.

In one or more embodiments, referring to FIG. 6, a vehicle gear control method is provided, including the following steps:

S602: During the driving of a vehicle, collect scene information around the vehicle in real time through an on-board camera deployed on the vehicle to obtain at least one driving scene image.

S604: Based on road features extracted from the driving scene image, output at least one of a road slope label, a bend curvature label, a road surface adhesion label, a road surface evenness label, a traffic light label, and a traffic sign label by a second road model.

S606: Based on traffic features which are extracted from the driving scene image, output at least one of a pedestrian danger level label, a pedestrian congestion condition label, a motor vehicle danger level label, a motor vehicle congestion condition label, a non-motor vehicle danger level label and a non-motor vehicle congestion condition label by a second traffic model.

S608: Based on environment features which are extracted from the driving scene image, output at least one of a road visibility label, a weather condition label, and a light intensity label by a second environment model.

S610: Acquire driving status data and driving behavior data corresponding to the vehicle.

S612: Determine a target driving mode of the vehicle; acquire a target gear shifting schedule table corresponding to the target driving mode; and look up a corresponding candidate gear shifting mode from the target gear shifting schedule table based on the driving status data and the driving behavior data.

S614: Determine a label priority of each driving scene label corresponding to the driving scene image; and determine a label confidence of each driving scene label corresponding to the driving scene image.

S616: Based on the label priority and the label confidence, screen a target driving scene label from the driving scene labels corresponding to the driving scene images, and determine a target gear shifting mode matched with the vehicle according to the target driving scene label, the driving status data, and the driving behavior data.

S618: Determine a gear range and a gear shifting time range, which correspond to the driving scene label, the driving status data and the driving behavior data.

S620: In a case that a candidate gear in the candidate gear shifting mode exceeds the gear range, adjust the candidate gear according to the gear range to obtain a target gear matched with the vehicle.

S622: In a case that candidate gear shifting time in the candidate gear shifting mode exceeds the gear shifting time range, adjust the candidate gear shifting time according to the gear shifting time range to obtain target gear shifting time matched with the vehicle.

S624: In a case that there are a preset number of driving scene labels having a less than or equal to a preset difference threshold in driving scene labels corresponding to a plurality of driving scene images, control the vehicle during driving through the target gear shifting mode to drive according to the target gear at the target gear shifting time.

S626: Determine label confidences corresponding to the road attribute label, the traffic attribute label, and the environment attribute label, respectively; and in a case that the label confidences corresponding to the road attribute label, the traffic attribute label, and the environment attribute label, respectively are greater than or equal to a preset confidence threshold, control the vehicle during driving through the target gear shifting mode to drive according to the target gear at the target gear shifting time.

In the aforementioned vehicle gear control method, after the driving scene image is acquired during driving, image recognition may be performed on the image to obtain the corresponding driving scene label. After the driving status data and the driving behavior data are acquired, the target gear shifting mode matched with the vehicle may be determined based on the driving status data, the driving behavior data and the driving scene label. In this way, the vehicle during driving may be controlled to drive according to the target gear at target gear shifting time. Since the target gear shifting mode is determined by integrating the driving status data, the driving behavior data and the driving scene label, the accuracy of determining the target gear shifting mode is improved.

Figure 7:
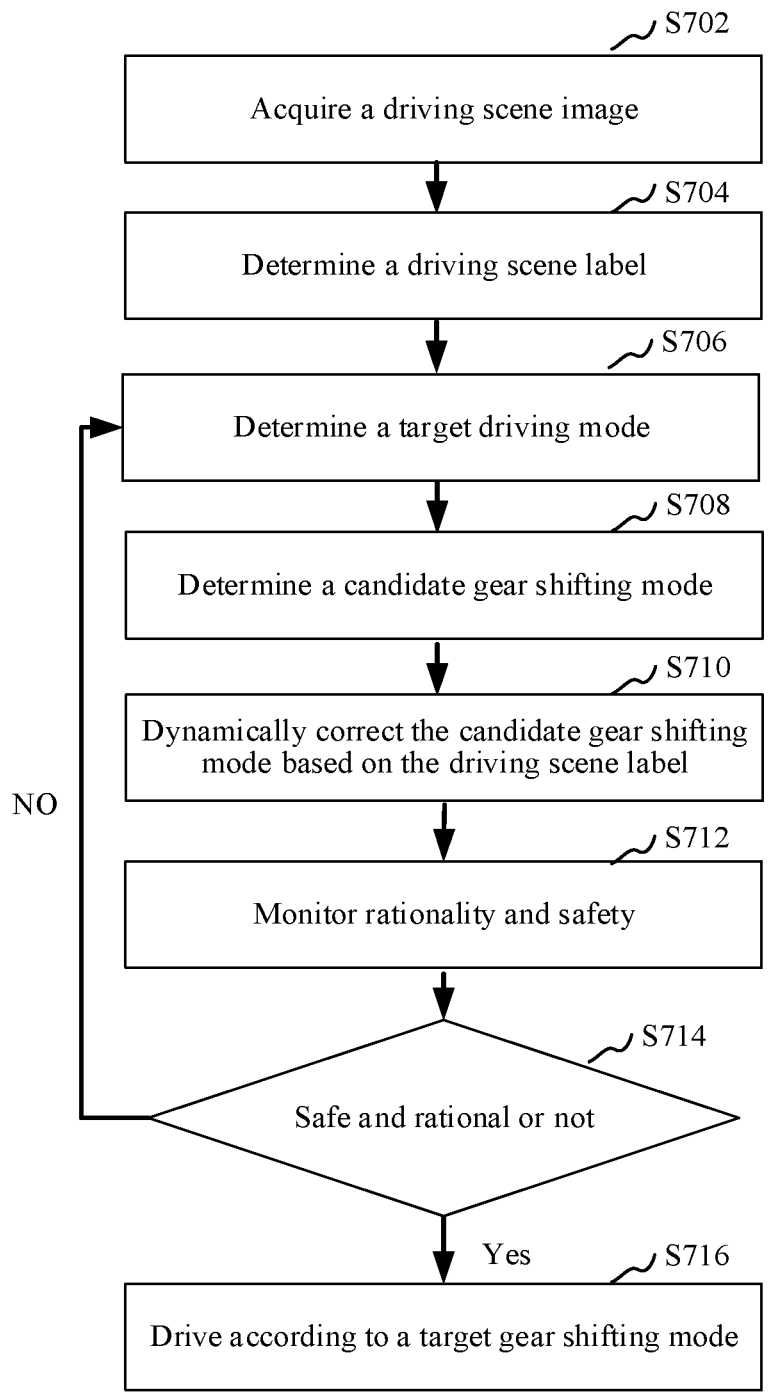
FIG. 7 is a schematic flowchart of a vehicle gear control method according to another embodiment.

This disclosure further provides an application scenario, which uses the aforementioned vehicle gear control method. Specifically, the vehicle gear control method is applied in such application scenario as follows:

referring to FIG. 7, step S702: The vehicle can acquire at least one consecutive driving scene image when a driving object drives the vehicle in the driving area. Step S704: The vehicle can perform image recognition on the acquired driving scene image by the scene classification model to obtain a corresponding driving scene label. Step S706:

The vehicle can determine a target driving mode selected by the driving object. Step S708: The vehicle can determine a target gear shifting schedule table (also referred as a gear shifting schedule map table) corresponding to the target driving mode, and determine a candidate gear shifting mode corresponding to current driving status data and current driving behavior data based on the target gear shifting schedule table. Step S710: The vehicle performs dynamic correction on the candidate gear shifting mode based on the driving scene label to obtain a target gear shifting mode. Step S712: The vehicle monitors the rationality and safety of the target gear shifting mode. Step S714: The vehicle determines whether the target gear shifting mode is rational and safe according to a monitoring result. Step S716: The vehicle drives according to a target gear at target gear shifting time while determining that the target gear shifting mode is rational and safe. FIG. 7 illustrates a schematic flowchart of a vehicle gear control method according to one or more embodiments.

This disclosure also further provides an application scenario, which uses the aforementioned vehicle gear control method. Specifically, the vehicle gear control method is applied in such application scenario as follows:

before a driving vehicle is on a driving area, an on-board camera may be mounted on the vehicle, so that driving scene images of the vehicle during driving may be collected through the on-board camera. Further, the vehicle sends the driving scene images to a server; performs image recognition on the driving scene images by the server through the scene classification model to obtain corresponding driving scene labels; and determines a target gear shifting mode matched with the vehicle based on driving status data, driving behavior data and driving scene labels and sends the target gear shifting mode to the vehicle, such that the vehicle drives according to a target gear at target gear shifting time.

It is to be understood that, although the steps in the flowcharts of FIG. 2 and FIG. 6 are sequentially shown according to the indication of arrows, the steps are not necessarily sequentially performed according to the sequence indicated by the arrows. Unless otherwise explicitly specified in this specification, execution of the steps is not strictly limited, and the steps may be performed in other sequences. Moreover, at least some of the steps in FIG. 2 and FIG. 6 may include a plurality of steps or a plurality of stages. These steps or stages are not necessarily performed at the same moment, but may be performed at different moments. These steps or stages are not necessarily executed sequentially, but may be performed with at least one part of the other steps or steps of other steps or stages in turn.

Figure 8:
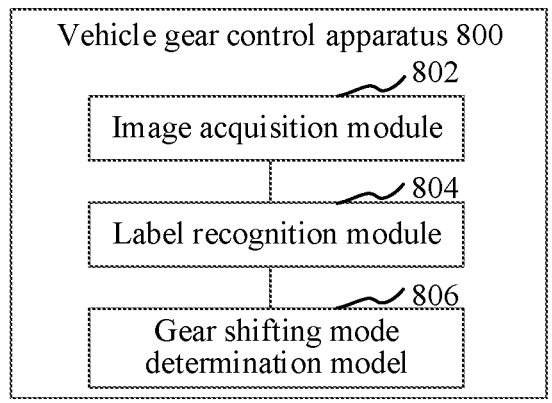
FIG. 8 is a structural block diagram of a vehicle gear control apparatus according to an embodiment.

In one or more embodiments, as shown in FIG. 8, a vehicle gear control apparatus 800 is provided. The apparatus may use a software module or a hardware module or a combination thereof as one part of a computer device, and specifically includes: an image acquisition module 802, a label recognition module 804 and a gear shifting mode determination module 806.

The image acquisition module 802 is configured to acquire a driving scene image during the driving of a vehicle.

The label recognition module 804 is configured to perform image recognition on the acquired driving scene image to obtain a driving scene label; and the driving scene label at least includes one of a road attribute label, a traffic attribute label and an environment attribute label.

The gear shifting mode determination module 806 is configured to acquire driving status data and driving behavior data corresponding to the vehicle; and determine a target gear shifting mode matched with the vehicle based on the driving status data, the driving behavior data, and the driving scene label; the target gear shifting mode being used for controlling the vehicle during driving to drive according to a target gear at target gear shifting time.

Figure 9:
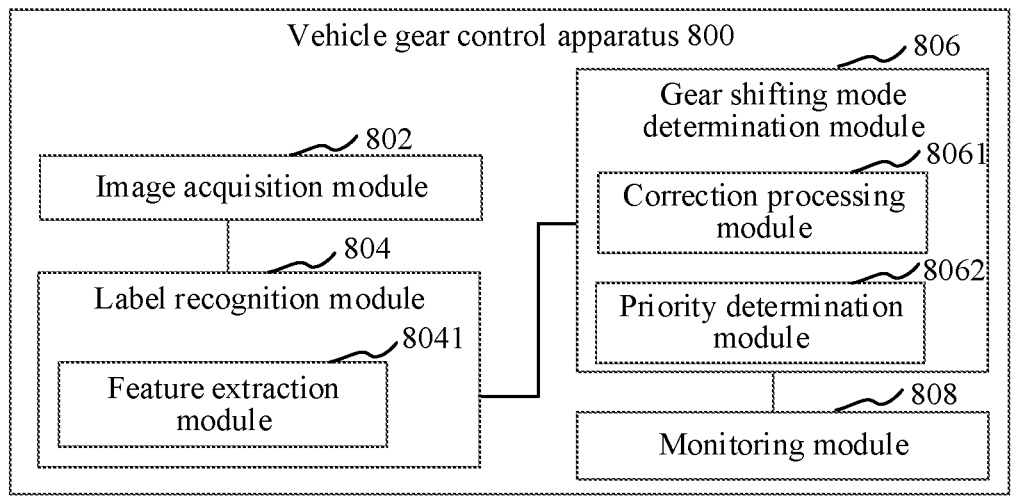
FIG. 9 is a structural block diagram of a vehicle gear control apparatus according to an embodiment.

In one or more embodiments, referring to FIG. 9, the image acquisition module is further configured to collect scene information around the vehicle in real time during the driving of the vehicle by an on-board camera deployed on the vehicle to obtain at least one driving scene image.

In one or more embodiments, the label recognition module 804 further includes a feature extraction module 8041 configured to acquire a scene classification model; extract image features in the driving scene image by the scene classification model; the image features including road features, traffic features, and environment features; and based on the road features, the traffic features, and the environment features, determine a road attribute label, a traffic attribute label and an environment attribute label that correspond to the driving scene image by the scene classification model.

In one or more embodiments, the label recognition module 804 is further configured to output a driving scene label by the scene classification model; the scene classification model includes a first road model related to roads, a first traffic model related to traffic, and a first environment model related to environments; the first road model at least includes one of a road slope model, a bend curvature model, a road surface adhesion model, a road surface evenness model, a traffic light model, and a traffic sign model; the first traffic model at least includes one of a danger level model and a congestion condition model; the first environment model at least includes one of a road visibility model, a weather condition model, and a light intensity model; the road attribute label at least includes one of a road slope label outputted by the road slope model, a bend curvature label outputted by the bend curvature model, a road surface adhesion label outputted by the road surface adhesion model, a road surface evenness label outputted by the road surface evenness model, a traffic light label outputted by the traffic light model, and a traffic sign label outputted by the traffic sign model; the traffic attribute label at least includes one of a danger level label outputted by the danger level model and a congestion condition label outputted by the congestion condition model; and the environment attribute label at least includes one of a road visibility label outputted by the road visibility model, a weather condition label outputted by the weather condition model, and a light intensity label outputted by the light intensity model.

In one or more embodiments, the road attribute label at least includes one of a road condition label and a road facility label; the road condition label at least includes one of a road slope label, a bend curvature label, a road surface adhesion label, and a road surface evenness label; the road facility label at least includes one of a traffic light label and a traffic sign label; the traffic attribute label at least includes one of a pedestrian label, a motor vehicle label, and a non-motor vehicle label; the pedestrian label at least includes one of a pedestrian danger level label and a pedestrian congestion condition label; the motor vehicle label at least includes one of a motor vehicle danger level label and a motor vehicle congestion condition label; the non-motor vehicle label at least includes one of a non-motor vehicle danger level label and a non-motor vehicle congestion condition label; the environment attribute label at least includes one of a weather label and a light label; the weather label at least includes one of a road visibility label and a weather condition label; the light label at least includes a light intensity label; the label recognition module 804 is further configured to, based on the road features, output at least one of the road slope label, the bend curvature label, the road surface adhesion label, the road surface evenness label, the traffic light label, and the traffic sign label by the second road model; based on the traffic features, output at least one of the pedestrian danger level label, the pedestrian congestion condition label, the motor vehicle danger level label, the motor vehicle congestion condition label, the non-motor vehicle danger level label and the non-motor vehicle congestion condition label by the second traffic model; and based on the environment features, output at least one of the road visibility label, the weather condition label, and the light intensity label by the second environment model.

In one or more embodiments, the gear shifting mode determination module 806 further includes a correction processing module 8061 configured to determine a corresponding candidate gear shifting mode based on the driving status data and the driving behavior; and perform correction processing on the candidate gear shifting mode based on the driving scene label to obtain a target gear shifting mode matched with the vehicle.

In one or more embodiments, the correction processing module 8061 is further configured to determine a target driving mode of the vehicle; acquire a target gear shifting schedule table corresponding to the target driving mode; and look up a corresponding candidate gear shifting mode from the target gear shifting schedule table based on the driving status data and the driving behavior data.

In one or more embodiments, the correction processing module 8061 is further configured to determine a gear range and a gear shifting time range, which correspond to the driving scene label, the driving status data and the driving behavior data; in a case that a candidate gear in the candidate gear shifting mode exceeds the gear range, adjust the candidate gear according to the gear range to obtain a target gear matched with the vehicle; and in a case that candidate gear shifting time in the candidate gear shifting mode exceeds the gear shifting time range, adjust the candidate gear shifting time according to the gear shifting time range to obtain target gear shifting time matched with the vehicle.

In one or more embodiments, there are a plurality of driving scene images and the time for collecting the plurality of driving scene images is consecutive; the vehicle gear control apparatus 800 further includes a monitoring module 808 configured to determine a label difference between the driving scene labels corresponding to each driving scene image in the plurality of driving scene images; determine the number of driving scene labels having the label difference less than or equal to a preset difference threshold; and in a case that the number is greater than or equal to a preset number threshold, control the vehicle during driving to drive according to the target gear at the target gear shifting time.

In one or more embodiments, the monitoring module 808 is further configured to determine label confidences corresponding to the road attribute label, the traffic attribute label, and the environment attribute label, respectively; in a case that the label confidences corresponding to the road attribute label, the traffic attribute label, and the environment attribute label, respectively are less than or equal to a preset confidence threshold, control the vehicle during driving to drive according to the target gear at the target gear shifting time.

In one or more embodiments, the gear shifting mode determination module 806 further includes a priority determination module 8062 configured to determine a label priority of each driving scene label corresponding to the driving scene image; determine a label confidence of each driving scene label corresponding to the driving scene image; based on the label priority and the label confidence, screen a target driving scene label from the driving scene labels corresponding to the driving scene images; and determine a target gear shifting mode matched with the vehicle according to the target driving scene label, the driving status data, and the driving behavior data.

In one or more embodiments, the vehicle gear control apparatus 800 is further configured to determine a current gear of the vehicle; and in a case that a target gear in the target gear shifting mode is inconsistent with the current gear, adjust the current gear of the vehicle to the target gear at the target gear shifting time to control the vehicle to drive according to the target gear at the target gear shifting time.

For a specific limitation on the vehicle gear control apparatus, refer to the limitation on the vehicle gear control method above. Details are not described herein again. The modules in the foregoing vehicle gear control apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In one or more embodiments, a computer device is provided. The computer device may be an electronic device, a vehicle, or a server, and an internal structure diagram thereof may be shown in FIG. 10. The computer device includes a processor (including processing circuitry), a memory (including a non-transitory computer-readable storage medium), and a network interface that are connected by using a system bus. The processor of the terminal is configured to provide computing and control capabilities. The memory of the terminal includes a non-volatile storage medium and an internal memory. The non-volatile storage medium stores an operating system, a computer program, and a database. The internal memory provides an environment for running of the operating system and the computer program in the non-volatile storage medium. The database of the computer device is configured to store the vehicle gear control data. The network interface of the terminal is configured to communicate with an external terminal through a network connection. The computer program is executed by the processor to implement a vehicle gear control method.

Figure 10:
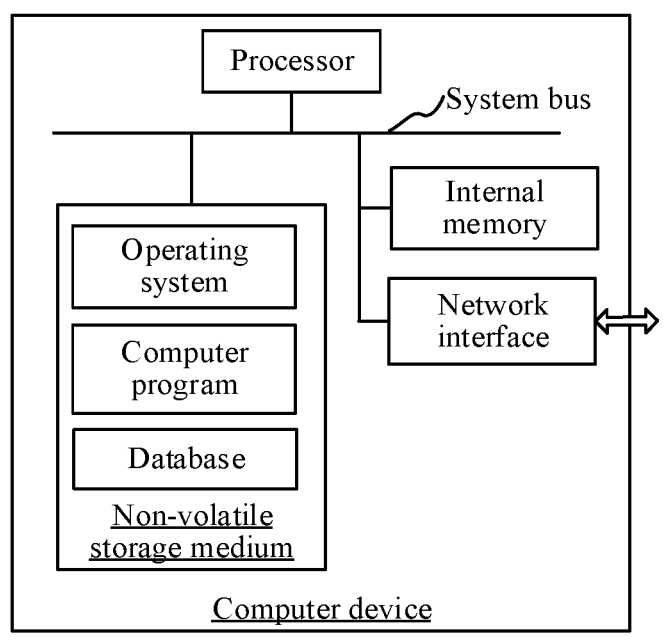
FIG. 10 is a diagram of an internal structure of a computer device according to an embodiment.

A person skilled in the art may understand that, the structure shown in FIG. 10 is only a block diagram of a part of a structure related to a solution of this disclosure and does not limit the computer device to which the solution of this disclosure is applied. Specifically, the computer device may include more or fewer components than those in the drawings, or some components are combined, or a different component deployment is used.

In one or more embodiments, a computer device is further provided, including a memory and a processor, the memory storing a computer program, when executed by the processor, causing the processor to perform the steps in the foregoing method embodiments.

In one or more embodiments, a computer-readable storage medium is provided, storing a computer program, the computer program, when executed by a processor, implementing the steps in the foregoing method embodiments.

In one or more embodiments, a computer program product or a computer program is provided. The computer program product or the computer program includes computer instructions, and the computer instructions are stored in a computer-readable storage medium. The processor of the computer device reads the computer instructions from the computer-readable storage medium, and the processor executes the computer instructions, to cause the computer device to perform the steps in the method embodiments.

A person of ordinary skill in the art may understand that all or some of procedures of the method in the foregoing embodiments may be implemented by a computer program instructing relevant hardware. The computer program may be stored in a non-volatile computer-readable storage medium. When the computer program is executed, the procedures of the foregoing method embodiments may be implemented. Any reference to a memory, a storage, a database, or another medium used in the embodiments provided in this disclosure may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be randomly combined. For concise description, not all possible combinations of the technical features in the embodiment are described. However, provided that combinations of the technical features do not conflict with each other, the combinations of the technical features are considered as falling within the scope recorded in this specification.

The foregoing disclosure includes some exemplary embodiments of this disclosure which are not intended to limit the scope of this disclosure. Other embodiments shall also fall within the scope of this disclosure.

What is claimed is:

1. A vehicle gear control method, comprising:
    acquiring a driving scene image while a vehicle is driving;
    performing image recognition on the acquired driving scene image to obtain a driving scene label comprising at least one of a road attribute label of a road on which the vehicle is driving, a traffic attribute label of the road on which the vehicle is driving, or an environment attribute label of an environment surrounding the vehicle;
    acquiring driving status data and driving behavior data corresponding to the vehicle, wherein the driving status data indicates at least one of vehicle speed or vehicle acceleration and the driving behavior data indicates at least one of a brake control input, an control input, or a throttle opening degree; and
    determining a gear shifting mode based on the driving status data, the driving behavior data, and the driving scene label, the gear shifting mode controlling the vehicle to drive according to a corresponding gear at a corresponding gear shifting time.

2. The method according to claim 1, wherein the acquiring the driving scene image comprises:
    while the vehicle is driving, collecting at least one driving scene image around the vehicle in real time through an on-board camera.

3. The method according to claim 1, wherein the performing comprises:
    acquiring a scene classification model;
    extracting image features in the driving scene image using the scene classification model, the image features comprising at least one of road features, traffic features, or environment features; and
    based on the at least one of the road features, the traffic features, or the environment features, determining, using the scene classification model, at least one of the road attribute label, the traffic attribute label, or the environment attribute label that correspond to the driving scene image.

4. The method according to claim 3, wherein
the acquiring the scene classification model includes:
    acquiring a first road model comprising at least one of a road slope model, a bend curvature model, a road surface adhesion model, a road surface evenness model, a traffic light model, or a traffic sign model;
    acquiring a first traffic model comprising at least one of a danger level model or a congestion condition model; and
    acquiring a first environment model comprising at least one of a road visibility model, a weather condition model, or a light intensity model; and the determining the at least one of the road attribute label, the traffic attribute label, or the environment attribute label includes at least one of:
    determining at least one of a road slope label outputted by the road slope model, a bend curvature label outputted by the bend curvature model, a road surface adhesion label outputted by the road surface adhesion model, a road surface evenness label outputted by the road surface evenness model, a traffic light label outputted by the traffic light model, or a traffic sign label outputted by the traffic sign model;
    determining at least one of a danger level label outputted by the danger level model or a congestion condition label outputted by the congestion condition model; or
    determining at least one of a road visibility label outputted by the road visibility model, a weather condition label outputted by the weather condition model, or a light intensity label outputted by the light intensity model.

5. The method according to claim 3, wherein
the acquiring the scene classification model includes acquiring a second road model, a second traffic model, and a second environment model; and
the determining the at least one of the road attribute label, the traffic attribute label, or the environment attribute label includes at least one of:
    determining, by the second road model based on the road features, at least one of a road condition label or a road facility label, the road condition label comprises at least one of a road slope label, a bend curvature label, a road surface adhesion label, or a road surface evenness label, and the road facility label comprises at least one of a traffic light label or a traffic sign label;
    determining, by the second traffic model based on the traffic features, at least one of a pedestrian label, a motor vehicle label, or a non-motor vehicle label, the pedestrian label comprises at least one of a pedestrian danger level label or a pedestrian congestion condition label, the motor vehicle label comprises at least one of a motor vehicle danger level label or a motor vehicle congestion condition label, the non-motor vehicle label comprises at least one of a non-motor vehicle danger level label or a non-motor vehicle congestion condition label; or
    determining, by the second environment model based on the environment features, at least one of a weather label or a light label, the weather label comprises at least one of a road visibility label or a weather condition label, the light label comprises a light intensity label.

6. The method according to claim 1, wherein the determining comprises:
    determining a candidate gear shifting mode based on the driving status data and the driving behavior data; and
    performing correction processing on the candidate gear shifting mode based on the driving scene label to obtain the determined gear shifting mode.

7. The method according to claim 6, wherein the determining the candidate gear shifting mode comprises:
    determining a driving mode of the vehicle;
    acquiring a gear shifting schedule table corresponding to the determined driving mode; and
    determining the candidate gear shifting mode based on the gear shifting schedule table, the driving status data, and the driving behavior data.

8. The method according to claim 6, wherein
the determined gear shifting mode comprises the corresponding gear and the corresponding gear shifting time; and
the performing the correction processing comprises:
  determining a gear range and a gear shifting time range, which correspond to the driving scene label, the driving status data, and the driving behavior data;
  when a candidate gear in the candidate gear shifting mode exceeds the gear range, adjusting the candidate gear according to the gear range to obtain the corresponding gear of the determined gear shifting mode; and
  when a candidate gear shifting time in the candidate gear shifting mode exceeds the gear shifting time range, adjusting the candidate gear shifting time according to the gear shifting time range to obtain the corresponding gear shifting time of the determined gear shifting mode.

9. The method according to claim 6, wherein
the acquiring the driving scene image includes acquiring a plurality of driving scene images captured consecutively; and
the method further comprises:
  determining a label difference between driving scene labels corresponding to each of the plurality of driving scene images;
  determining a number of driving scene labels having a label difference less than or equal to a preset difference threshold; and
  in response to a determination that the number is greater than or equal to a preset number threshold, controlling the vehicle to drive according to the corresponding gear at the corresponding gear shifting time according to the determined gear shifting mode.

10. The method according to claim 1, further comprising:
determining label confidences corresponding to the at least one of the road attribute label, the traffic attribute label, or the environment attribute label, respectively; and
in response to a determination that the label confidences corresponding to the at least one of the road attribute label, the traffic attribute label, or the environment attribute label, respectively are greater than or equal to a preset confidence threshold, controlling the vehicle to drive according to the corresponding gear at the corresponding gear shifting time according to the determined gear shifting mode.

11. The method according to claim 1, wherein
the acquiring the driving scene image includes acquiring a plurality of driving scene images;
the performing the image recognition includes obtaining a corresponding driving scene label for each of the plurality of driving scene images; and
the determining the gear shifting mode comprises:
  determining a label priority of each driving scene label corresponding to the driving scene images;
  determining a label confidence of each driving scene label corresponding to the driving scene images;
  based on the label priority and the label confidence, selecting a driving scene label from the driving scene labels corresponding to the driving scene images; and
  determining the gear shifting mode according to the selected driving scene label, the driving status data, and the driving behavior data.

12. The method according to claim 1, further comprising:
determining a current gear of the vehicle; and
when the corresponding gear in the determined gear shifting mode is inconsistent with the current gear, adjusting the current gear of the vehicle to the corresponding gear at the corresponding gear shifting time to control the vehicle to drive according to the corresponding gear at the corresponding gear shifting time.

13. A vehicle gear control apparatus, the apparatus comprising:
processing circuitry configured to
  acquire a driving scene image while a vehicle is driving;
  perform image recognition on the acquired driving scene image to obtain a driving scene label comprising at least one of a road attribute label of a road on which the vehicle is driving, a traffic attribute label of the road on which the vehicle is driving, or an environment attribute label of an environment surrounding the vehicle;
  acquire driving status data and driving behavior data corresponding to the vehicle, wherein the driving status data indicates at least one of vehicle speed or vehicle acceleration and the driving behavior data indicates at least one of a brake control input, an accelerator control input, or a throttle opening degree; and
  determine a gear shifting mode based on the driving status data, the driving behavior data, and the driving scene label, the gear shifting mode controlling the vehicle to drive according to a corresponding gear at a corresponding gear shifting time.

14. The apparatus according to claim 13, wherein the processing circuitry is further configured to collect, while the vehicle is driving, at least one driving scene image around the vehicle in real time by controlling an on-board camera.

15. The apparatus according to claim 13, wherein the processing circuitry is further configured to:
acquire a scene classification model;
extract image features in the driving scene image using the scene classification model, the image features comprising at least one of road features, traffic features, or environment features; and
based on the at least one of road features, the traffic features, or the environment features, determine, using the scene classification model, at least one of the road attribute label, the traffic attribute label, or the environment attribute label that correspond to the driving scene image.

16. The apparatus according to claim 13, wherein the processing circuitry is further configured to:
determine a candidate gear shifting mode based on the driving status data and the driving behavior data; and
perform correction processing on the candidate gear shifting mode based on the driving scene label to obtain the determined gear shifting mode.

17. The apparatus according to claim 16, wherein the processing circuitry is further configured to:
determine a driving mode of the vehicle;
acquire a gear shifting schedule table corresponding to the determined driving mode; and
determine the candidate gear shifting mode based on the gear shifting schedule table, the driving status data, and the driving behavior data.

18. The apparatus according to claim 13, wherein the processing circuitry is further configured to:

determine label confidences corresponding to the at least one of the road attribute label, the traffic attribute label, or the environment attribute label, respectively; and in response to a determination that the label confidences corresponding to the at least one of the road attribute label, the traffic attribute label, or the environment attribute label, respectively are greater than or equal to a preset confidence threshold, control the vehicle to drive according to the corresponding gear at the corresponding gear shifting time according to the determined gear shifting mode.

19. The apparatus according to claim 13, wherein the processing circuitry is further configured to:

determine a current gear of the vehicle; and when the corresponding gear in the determined gear shifting mode is inconsistent with the current gear, adjust the current gear of the vehicle to the corresponding gear at the corresponding gear shifting time to control the vehicle to drive according to the corresponding gear at the corresponding gear shifting time.

20. A non-transitory computer-readable storage medium storing computer-readable instructions thereon, which, when executed by a computer device, cause the computer device to perform a vehicle gear control method comprising:

acquiring a driving scene image while a vehicle is driving;

performing image recognition on the acquired driving scene image to obtain a driving scene label comprising at least one of a road attribute label of a road on which the vehicle is driving, a traffic attribute label of the road on which the vehicle is driving, or an environment attribute label of an environment surrounding the vehicle;

acquiring driving status data and driving behavior data corresponding to the vehicle, wherein the driving status data indicates at least one of vehicle speed or vehicle acceleration and the driving behavior data indicates at least one of a brake control input, an accelerator control input, or a throttle opening degree; and determining a gear shifting mode based on the driving status data, the driving behavior data, and the driving scene label, the gear shifting mode controlling the vehicle to drive according to a corresponding gear at a corresponding gear shifting time.

* * * * *

UNITED STATES PATENT AND TRADEMARK OFFICE
CERTIFICATE OF CORRECTION

PATENT NO. : 12,072,021 B2
APPLICATION NO. : 17/992513
DATED : August 27, 2024
INVENTOR(S) : Zhongyang Sun et al.

It is certified that error appears in the above-identified patent and that said Letters Patent is hereby corrected as shown below:

On the Title Page

Item (71), the Applicant city reads as:
Guangdong (CN)

Should read as:
--Shenzhen (CN)--

Signed and Sealed this
Fifteenth Day of July, 2025

Coke Morgan Stewart
*Acting Director of the United States Patent and Trademark Office*